United States Patent
Koyama et al.

(10) Patent No.: US 9,654,760 B2
(45) Date of Patent: May 16, 2017

(54) ENCODING DEVICE, DECODING DEVICE, ENCODING METHOD, AND DECODING METHOD

(71) Applicant: FUJITSU LIMITED, Kawasaki (JP)

(72) Inventors: Junpei Koyama, Shibuya (JP);
Kimihiko Kazui, Kawasaki (JP);
Hidenobu Miyoshi, Kawasaki (JP);
Satoshi Shimada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 485 days.

(21) Appl. No.: 13/670,942

(22) Filed: Nov. 7, 2012

(65) Prior Publication Data
US 2013/0156107 A1    Jun. 20, 2013

(30) Foreign Application Priority Data

Dec. 16, 2011    (JP) ................................. 2011-275828

(51) Int. Cl.
*H04N 7/32*     (2006.01)
*H04N 13/00*    (2006.01)
(Continued)

(52) U.S. Cl.
CPC ......... *H04N 13/0048* (2013.01); *H04N 19/55* (2014.11); *H04N 19/597* (2014.11); *H04N 13/004* (2013.01)

(58) Field of Classification Search
CPC .. H04N 19/55; H04N 19/597; H04N 13/0048; H04N 13/004
(Continued)

(56) References Cited

U.S. PATENT DOCUMENTS

2006/0177123 A1    8/2006 Ha
2007/0098075 A1*   5/2007 Ohgose et al. .......... 375/240.16
(Continued)

FOREIGN PATENT DOCUMENTS

EP    2355529 A2    8/2011
JP    2005-159824   6/2005
(Continued)

OTHER PUBLICATIONS

ISO/IEC 13818-2:1995, "Generic coding of moving pictures and associated audio information", 19995, pp. i-224.
ISO/IEC 14496-10, MPEG-4 Part 10 Advanced Video Coding for Generic Audiovisual Services, 2012, pp. i-xvii, 334-374.
Extended Search Report mailed Mar. 20, 2013 for corresponding European Application No. 12190775.2.

*Primary Examiner* — Tung Vo
*Assistant Examiner* — Zaihan Jiang
(74) *Attorney, Agent, or Firm* — Staas & Halsey LLP

(57) ABSTRACT

An encoding device includes a determination unit configured to determine, when performing detection of a motion vector using the decoded image of a frame image encoded in increments of blocks prior to the frame image to be encoded regarding an encoded block to be encoded of a plurality of blocks included in this frame image to be encoded at the time of encoding a frame image included in a moving image where a first image and a second image are arrayed using inter-image prediction encoding processing, correlation height as to the image of the encoded block regarding each of the image of a first area corresponding to the first image and the image of a second area corresponding to the second image included in a boundary block straddling a boundary between the first image and the second image of a block included in the decoded image.

4 Claims, 26 Drawing Sheets

(51) Int. Cl.
*H04N 19/597* (2014.01)
*H04N 19/55* (2014.01)

(58) Field of Classification Search
USPC .................................................. 375/240.16
See application file for complete search history.

(56) References Cited

U.S. PATENT DOCUMENTS

| | | | |
|---|---|---|---|
| 2009/0220004 A1* | 9/2009 | Cieplinski | H04N 19/593 375/240.16 |
| 2011/0150280 A1* | 6/2011 | Tsuji | 382/103 |
| 2011/0228853 A1* | 9/2011 | Suzuki et al. | 375/240.16 |
| 2011/0280300 A1* | 11/2011 | Tourapis | H04N 13/0048 375/240.2 |
| 2012/0013605 A1* | 1/2012 | Seol | H04N 13/0022 345/419 |
| 2012/0128236 A1* | 5/2012 | Pekkucuksen | G06T 7/002 382/154 |
| 2012/0218236 A1* | 8/2012 | Hirose | G09G 3/003 345/204 |

FOREIGN PATENT DOCUMENTS

| | | |
|---|---|---|
| WO | WO 2006/116659 A2 | 11/2006 |
| WO | WO 2011/141060 A1 | 11/2011 |

* cited by examiner

FIG. 15
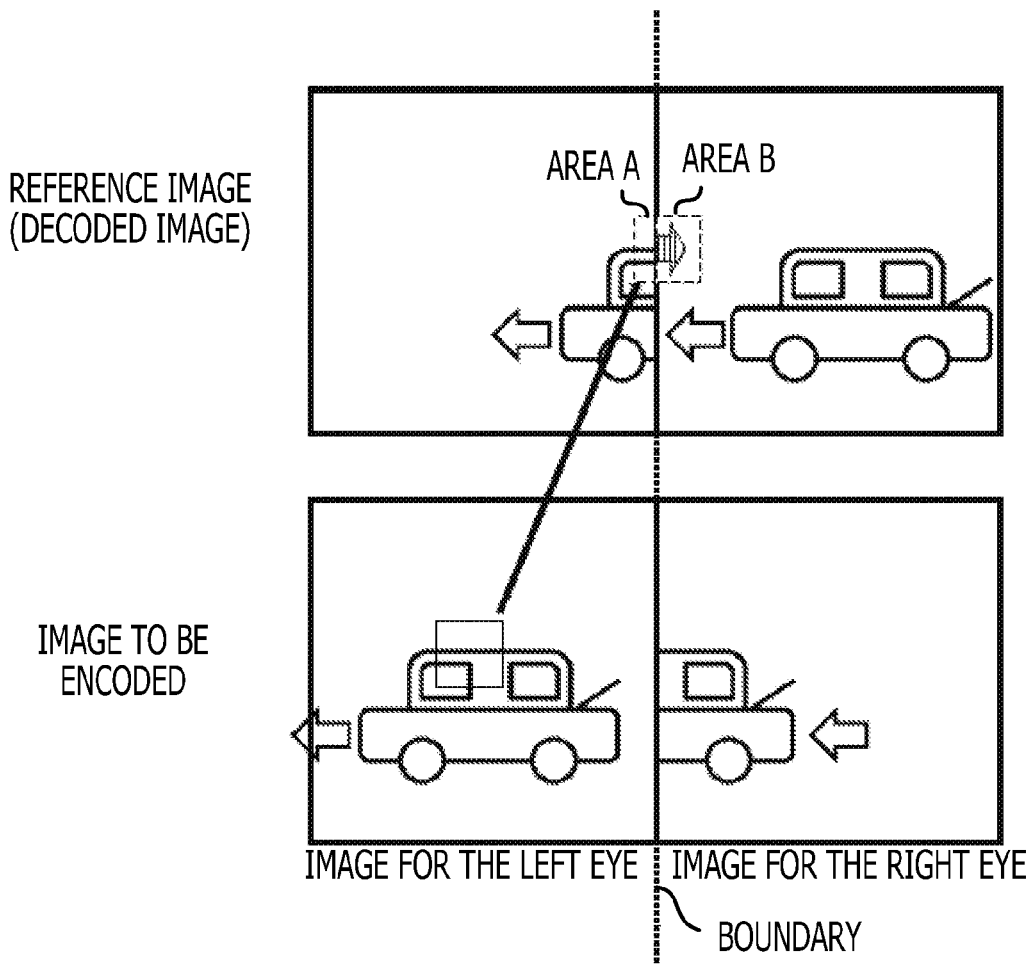
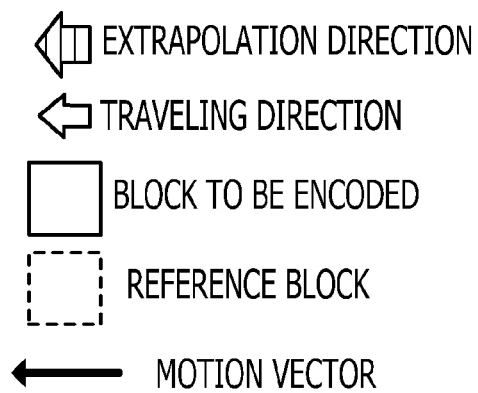

FIG. 24
RELATED ART

```
frame_packing_arrangement( payloadSize ) {
   frame_packing_arrangement_id
   frame_packing_arrangement_cancel_flag
   if( !frame_packing_arrangement_cancel_flag ) {
      frame_packing_arrangement_type
      quincunx_sampling_flag
      content_interpretation_type
      spatial_flipping_flag
      frame0_flipped_flag
      field_views_flag
      current_frame_is_frame0_flag
      frame0_self_contained_flag
      frame1_self_contained_flag
      if( !quincunx_sampling_flag &&
         frame_packing_arrangement_type != 5 ) {
         frame0_grid_position_x
         frame0_grid_position_y
         frame1_grid_position_x
         frame1_grid_position_y
      }
      frame_packing_arrangement_reserved_byte
      frame_packing_arrangement_repetition_period
   }
   frame_packing_arrangement_extension_flag
}
```

ENCODING DEVICE, DECODING DEVICE, ENCODING METHOD, AND DECODING METHOD

CROSS-REFERENCE TO RELATED APPLICATION(S)

This application is based upon and claims the benefit of priority of the prior Japanese Patent Application No. 2011-275828, filed on Dec. 16, 2011, the entire contents of which are incorporated herein by reference.

FIELD

The embodiments discussed herein are related to an encoding device, a decoding device, an encoding method, a decoding method, an encoding program, and a computer-readable recording medium in which a decoding program is stored.

BACKGROUND

Image data, particularly, moving image data is generally great in data volume, and accordingly, at the time of being transmitted from a transmission device to a reception device, or at the time of being stored in a storage device, or the like, high-efficiency encoding is performed. "High-efficiency encoding" mentioned here means encoding processing to transform a certain data string into another data string, and processing to compress data volume thereof.

The intra-screen prediction encoding method and inter-screen prediction encoding method have been known as a moving image data high-efficiency encoding method.

With the intra-screen prediction encoding method, the fact that that moving image data is high in correlation in the spatial direction is taken advantage of. That is to say, the intra-screen prediction encoding method is a method to encode/decode a frame image to be encoded using only the information of the frame image to be encoded without using another frame image. The intra-screen prediction encoding method may also be referred to as "intra-frame prediction encoding method".

Also, with the inter-screen prediction encoding method, the fact that moving image data is high in correlation in the temporal direction is taken advantage of. With moving image data, in general, a frame image temporally approximated is high in similarity, and accordingly, redundancy may be removed by performing encoding of a frame image to be encoded with reference to a decoded image decoded from an already encoded frame image. The inter-screen prediction encoding method may also be referred to as "inter-frame prediction encoding method".

With the inter-screen prediction encoding method, it is common to divide an image to be encoded into blocks, and to perform encoding in increments of the divided blocks. First, a decoded image is generated by decoding another already encoded frame image for reference, and the image in an area similar to the image of a block to be encoded is selected from the decoded image. Further, difference between the selected image of the area and the image of the block to be encoded is obtained as prediction error, and redundancy is removed. Motion vector information indicating a spatial gap as to the similar area, and the prediction error from which the redundancy has been removed are encoded, thereby realizing a high compression ratio. Note that the prediction error is also referred to as a prediction error image.

On the other hand, the reception device which has received encoded data decodes the received motion vector information and difference information to play an image thereof.

Examples of a typical moving image coding method include ISO/IEC MPEG-2/MPEG-4 (hereafter, MPEG-2, MPEG-4).

With the current moving image coding standard method represented by MPEG-2 Video or H.264/MPEG-4 AVC, an arrangement to handle encoding and decoding of a stereo 3-dimensional video is prepared. Two images having a different viewpoint are included in the 3-dimensional video to be handled here. Hereafter, these two different viewpoint images will be referred to as an image for the left eye and an image for the right eye.

In the event of encoding a stereoscopic image, an image for the left eye and an image for the right eye making up the video are thinned so as to divide the number of pixels of each image as illustrated in FIG. 23, and are arrayed and packed into one image, and then are encoded using a conventional coding method. Thinning and packing includes various methods. For example, the interleave method, side-by-side method, top-and-bottom method, and so forth have been known. The interleave method is a method to dispose an image for the right eye and an image for the left eye for each scanning line. The side-by-side method is a method to dispose an image for the left eye and an image for the right eye in a manner horizontally adjacent to each other. The top-and-bottom method is a method to dispose an image for the left eye and an image for the right eye in a manner vertically adjacent to each other. FIG. 23 illustrates a conceptual diagram of the side-by-side method.

When transmitting the encoded data of a stereoscopic image from the encoding device to the decoding device, information indicating that data to be transmitted is a bit stream encoded from the stereoscopic image is informed by being included in header information area of the transmission data. Therefore, for example, with MPEG-2, as disclosed in ISO/IEC 13818, Generic coding of moving pictures and associated audio information for example, the area of user_data is employed, and also, with H.264/MPE-4 AVC, as disclosed in ISO/IEC 14496-10, MPEG-4 part 10 advanced video coding, the area of Frame packing arrangement SEI is employed. FIG. 24 illustrates the syntax of header information to be used for Frame packing arrangement SEI of H.264/MPEG-4 AVC.

Note that in the event of encoding the above-mentioned stereoscopic image employing the side-by-side method or top-and-bottom method using inter-screen prediction, at the time of searching a block similar to the block to be encoded from a decoded image, images having a different viewpoint may be referenced (see FIG. 25). In this way, after taking images having a different viewpoint into consideration, a portion having high similarity is referenced, whereby encoding efficiency may be improved.

As technology for improving encoding efficiency, for example, technology other than the above has been disclosed in Japanese Laid-open Patent Publication No. 2005-159824, wherein global motion information (motion vector) between frame images is searched, and image information outside of a frame image to be referenced is created from the other image based on this global motion information. Note that the global motion information is motion information of the entire one image, and may be obtained from the statistics value of the motion vector of each of multiple areas making up one image.

SUMMARY

In accordance with an aspect of the embodiments, an encoding device includes a determination unit configured to determine, when performing detection of a motion vector using the decoded image of a frame image encoded in increments of blocks prior to the frame image to be encoded regarding an encoded block to be encoded of a plurality of blocks included in this frame image to be encoded at the time of encoding a frame image included in a moving image where a first image and a second image are arrayed using inter-image prediction encoding processing, correlation height as to the image of the encoded block regarding each of the image of a first area corresponding to the first image and the image of a second area corresponding to the second image included in a boundary block straddling a boundary between the first image and the second image of a block included in the decoded image, based on local information relating to the encoded block; and a substitution unit configured to perform substitution processing for substituting, of the image of the first area and the image of the second area included in the boundary block, a substitution image generated using the pixel values of an area determined to be higher in correlation with the image of the encoded block, for the image of an area determined to be lower in correlation with the image of the encoded block.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

These and/or other aspects and advantages will become apparent and more readily appreciated from the following description of the embodiments, taken in conjunction with the accompanying drawing of which:

FIG. 15 is an explanatory diagram for describing correlation determination processing according the third embodiment;

FIG. 24 is a diagram indicating the syntax of header information to be used in Frame packing arrangement SEI of H.264/MPEG-4 AVC;

DESCRIPTION OF EMBODIMENTS

Figure 26:
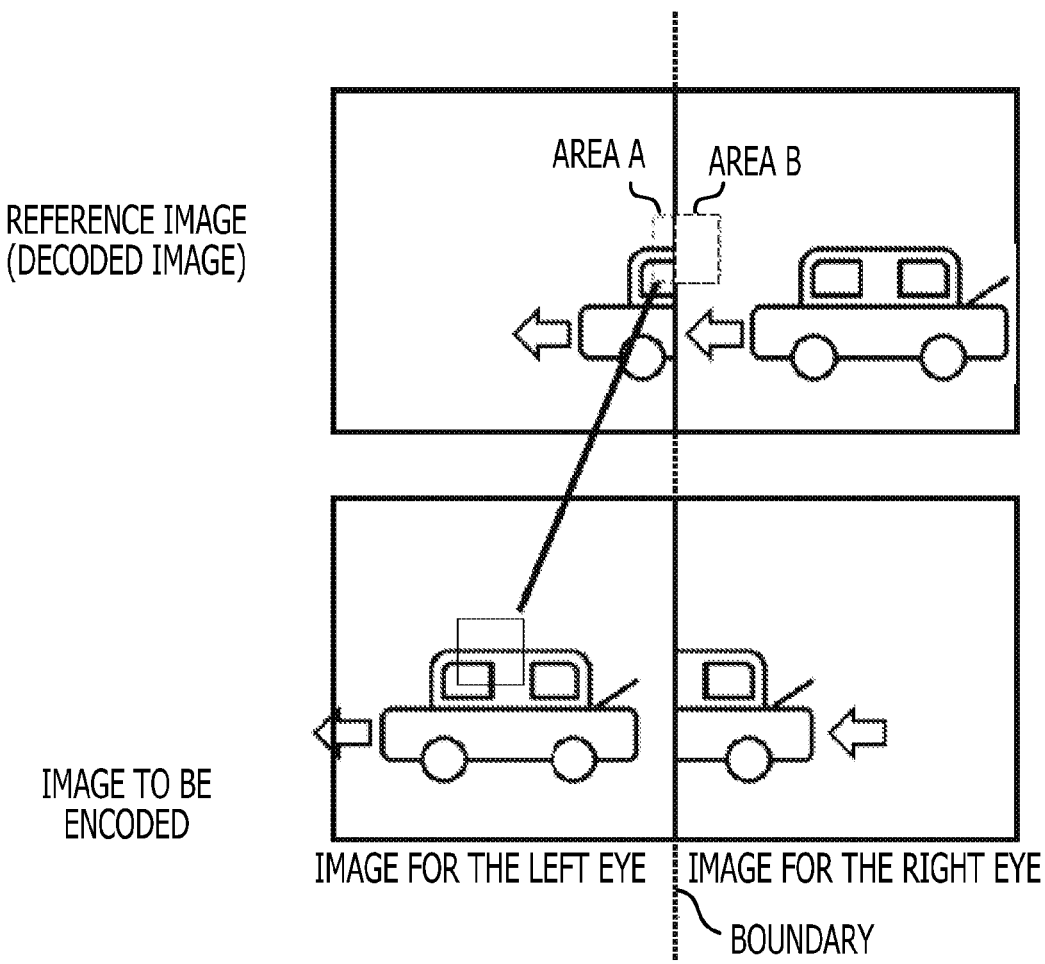
FIG. 26 is a diagram illustrating a state in which a reference block straddles a boundary between two images.

The following new findings have been obtained in verification by the present inventor and others, and accordingly, these will be described first. As illustrated in FIG. 26, a block on the decoding image side to be referenced at the time of encoding (hereafter, referred to as reference block) may straddle a boundary between an image for the left eye and an image for the right eye. An area corresponding to the image for the left eye within the reference block (area A) and an area corresponding to the image for the right eye (area B) completely differ in spatial positions when being collated with the actual space.

Therefore, a phenomenon occurs such that though any one of the area A and area B has high correlation with a block to be encoded (hereafter, referred to as encoded block), the other area has low correlation with the encoded block. For example, with the example in FIG. 26, the area A corresponding to the image for the left eye within the reference block has high correlation with the encoded block, and the area B corresponding to the image for the right eye has low correlation with the encoded block. However, with the current moving image coding standard, a phenomenon specific to this stereo 3-dimensional video is not taken into consideration, and special processing is not carried out at all. Accordingly, in the event of employing an area where pixel value correlation is low without change, prediction error increases, and encoding efficiency is deteriorated.

First Embodiment

Figure 1:
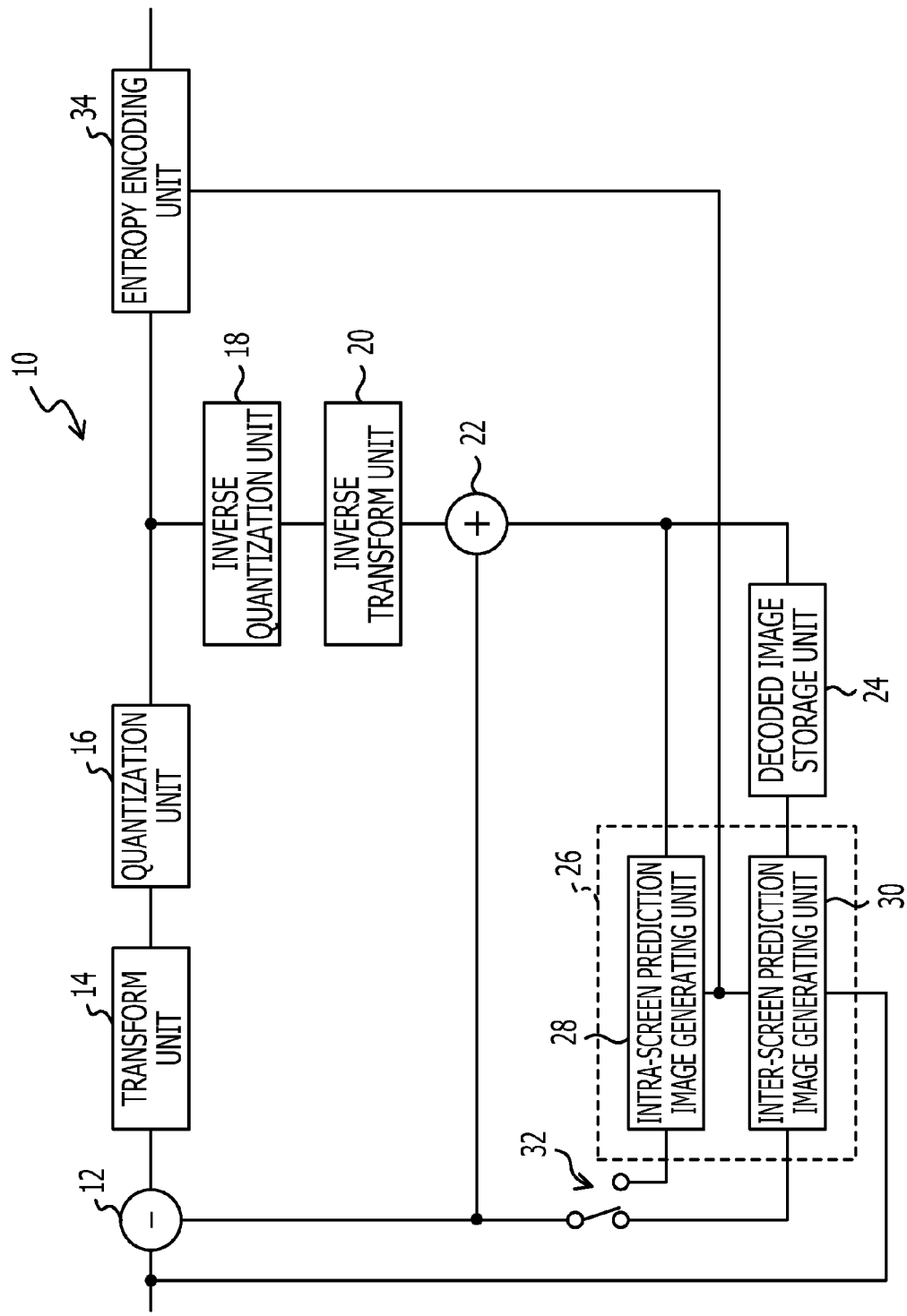
FIG. 1 is a block diagram illustrating the schematic configuration of an encoding device described in a first embodiment.

FIG. 1 illustrates an encoding device 10 according to the present embodiment. The encoding device 10 includes a prediction error image generating unit 12, a transform unit 14, a quantization unit 16, an inverse quantization unit 18, an inverse transform unit 20, a decoded image generating unit 22, a decoded image storage unit 24, an encoded block prediction image generating unit 26, a changeover switch 32, and an entropy encoding unit 34.

Note that the function units in the encoding device 10 may be realized with an electronic circuit or the like for example, and the encoding device 10 may be realized by a semiconductor integrated circuit, and more specifically, an ASIC (Application Specific Integrated Circuit) or the like for example. Also, the encoding device 10 may further include an operating unit which is an input device for accepting operation input by a user.

Outline regarding the function units in the encoding device 10 will be described below.

Image information representing the image of each block at the time of dividing a frame image included in a moving image into multiple blocks having a predetermined size is supplied to the prediction error image generating unit 12 as an object to be encoded. Here, blocks mentioned here means areas including multiple pixels. Hereafter, an block to be encoded will be referred to as an encoded block.

Figure 23:
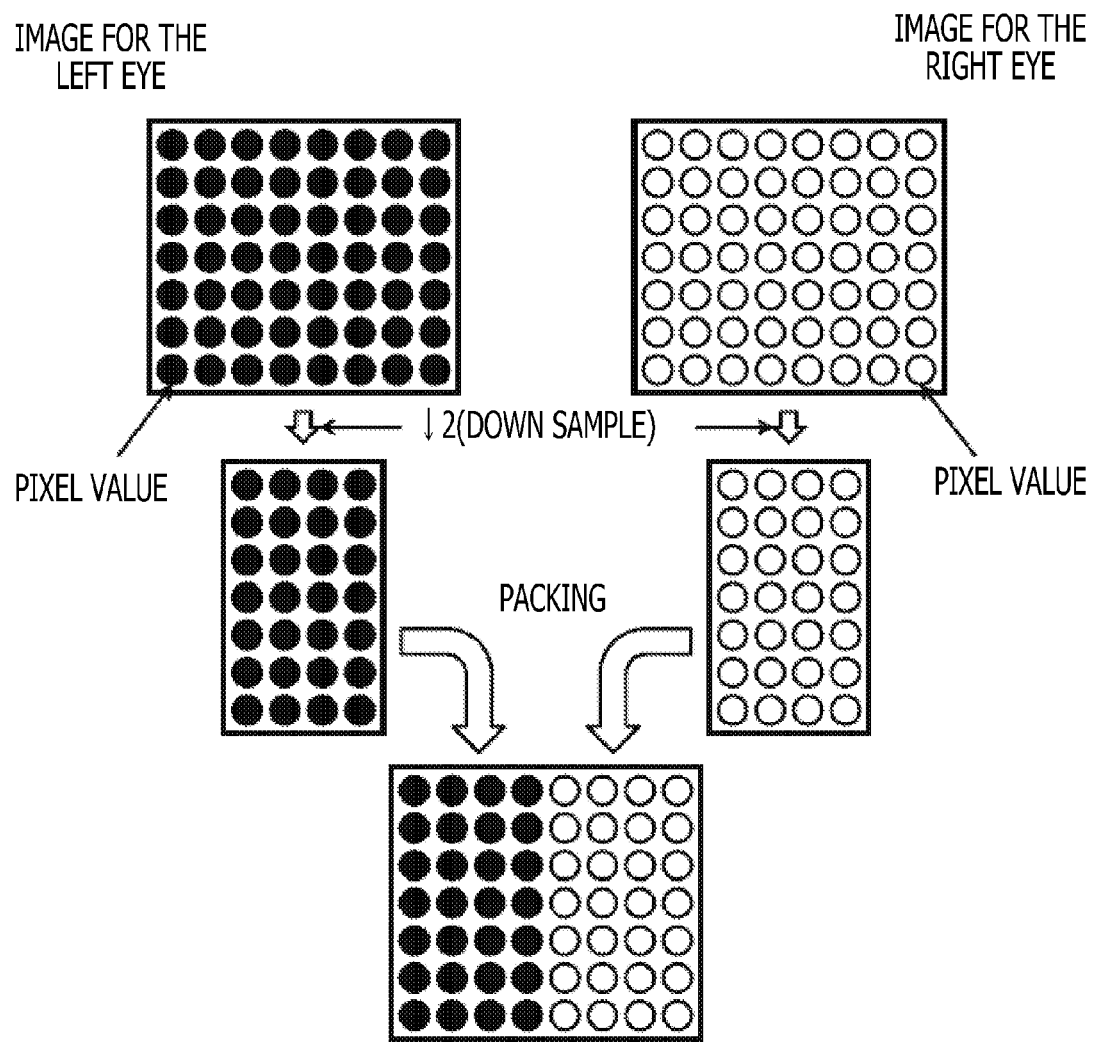
FIG. 23 is an explanatory diagram for describing a frame image according to the side-by-side method.
Figure 25:
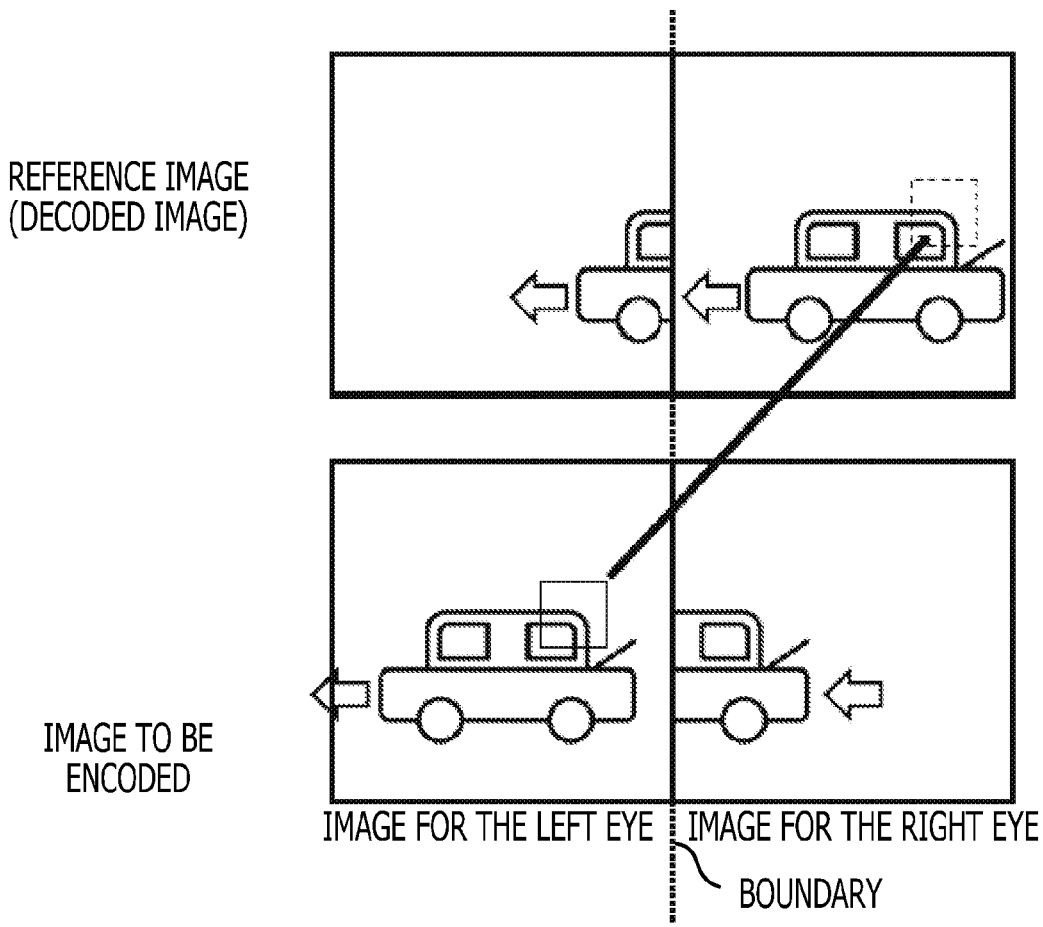
FIG. 25 is a diagram illustrating a reference state according to a motion vector exceeding a boundary between two images.

Here, the frame image is taken as a frame image where two images are arrayed. Further, with the present embodiment, these two images are taken as a first image and a second image which have a mutually different viewpoint (e.g., images where the same subject is shot from each of a pair of shooting positions separated by distance equivalent to parallax). Though the displacement method may be any method of the side-by-side method and top-and-bottom method for example, with the present embodiment, description will be made with reference to the side-by-side method as an example. Also, description will be made below assuming that the first image is an image for the left eye, and the second image is an image for the right eye. Note that, with a moving image in which the side-by-side method is employed, a position where a frame image is equally divided into the left and right becomes a boundary between the image for the left eye and the image for the right eye (also see FIG. 23).

Also, the image information of a prediction image is supplied from the encoded block prediction image generating unit 26 for the prediction error image generating unit 12 in increments of blocks. The prediction image will be described later. The prediction error image generating unit 12 calculates difference information indicating difference between the image information of an encoded block and the image information of a prediction image, and supplies this difference information to the transform unit 14 as the information of an prediction error image. In this way, a prediction error image is generated at the prediction error image generating unit 12.

The transform unit 14 subjects the information of the supplied prediction error image to transform processing to separate the prediction error image into horizontal and vertical direction frequency components. The information of each frequency component obtained by the transform processing is input to the quantization unit 16.

The quantization unit 16 quantizes the information supplied from the transform unit 14. The quantization unit 16 reduces the code amount of this prediction error image by quantization. The quantization unit 16 supplies information after quantization to the entropy encoding unit 34 and inverse quantization unit 18.

The inverse quantization unit 18 subjects the information supplied from the quantization unit 16 to inverse quantization to supply to the inverse transform unit 20.

The inverse transform unit 20 subjects the information supplied from the inverse quantization unit 18 to inverse transform processing. The inverse transform processing mentioned here means processing for transforming in the opposite direction of the transform processing to be performed at the transform unit 14.

The decoding processing is performed by the inverse quantization unit 18 and inverse transform unit 20, and accordingly, the information of the same image as the prediction error image before encoding is obtained. This will be referred to as a playback prediction error image.

The image information of the playback prediction error image subjected to inverse transform processing at the inverse transform unit 20 is supplied to the decoded image generating unit 22. Also, the image information of the prediction image generated at the encoded block prediction image generating unit 26 is supplied to the decoded image generating unit 22 in increments of blocks. The decoded image generating unit 22 generates an image decoded from the image of the encoded block (block decoded image) by adding the image information of the playback prediction error image and the image information of the prediction image, and delivers to the decoded image storage unit 24.

Note that the block decoded image of each of the encoded blocks is generated by the processes at the above function units being carried out on each block included in the frame image to be encoded, and an image decoded from the entire frame image is generated. Hereafter, the image decoded from the entire frame image will simply be referred to as a decoded image.

The decoded image storage unit 24 sequentially stores the image information of the block decoded image supplied from the decoded image generating unit 22 in memory. Thus, finally, the decoded image of the encoded entire frame image is stored. The stored decoded image is supplied to a later-described inter-screen prediction image generating unit 30, and is referenced at detection of a motion vector or motion compensation or the like at the time of encoding another frame image. Accordingly, of the stored decoded images, a decoded image to be referenced at the time of generating a prediction image at the inter-screen prediction image generating unit 30 is also referred to as "reference image". Which of the decoded images is referenced is determined according to the prediction mode and so forth of the frame image to be encoded. Also, hereafter, each block within the reference image will be referred to as a reference block.

The encoded block prediction image generating unit 26 includes an intra-screen prediction image generating unit 28 and an inter-screen prediction image generating unit 30. The encoded block prediction image generating unit 26 generates a prediction image in increments of blocks to supply to the prediction error image generating unit 12 and decoded image generating unit 22 (via the changeover switch 32), and also supplies side information obtained at the time of generation of the prediction image to the entropy encoding unit 34. The information of a motion vector, prediction mode, and so forth are included in the side information, for example.

The intra-screen prediction image generating unit 28 generates a prediction image at the time of performing encoding using the intra-screen prediction encoding method in increments of blocks. The intra-screen prediction encoding method is a method for encoding/decoding an image using only the information of the frame image to be encoded without using another frame image, and is also referred to as an intra-frame prediction encoding method. More specifically, this method is a method for estimating the motion of a nearby image from the images of peripheral blocks along a predetermined direction, predicting the image of the block to be encoded, and encoding difference between the predicted prediction image and the image of the encoded block in a single frame image.

The inter-screen prediction image generating unit 30 generates a prediction image at the time of performing encoding using the inter-screen prediction encoding method in increments of blocks. The inter-screen prediction encoding method is a method for generating a prediction image based on a frame image at different point-in-time, and encoding a difference (error) image between the image to be encoded and the prediction image, and is also referred to as an inter-frame prediction encoding method. The details will be described later.

The changeover switch 32 is a switch for selecting one of the prediction image generated at the intra-screen prediction image generating unit 28 and the prediction image generated at the inter-screen prediction image generating unit 30 to supply to the prediction error image generating unit 12 and decoded image generating unit 22. The changeover switch 32 is controlled and switched by a control unit which is not illustrated in the drawings.

The entropy encoding unit 34 subjects the information of the prediction error image after quantization supplied from the quantization unit 16, and the side information supplied from the encoded block prediction image generating unit 26 to entropy encoding. The entropy encoding mentioned here means processing to perform encoding assigning variable length code according to appearance frequency of symbols. An encoded signal (bit stream) generated by the entropy encoding is output to a predetermined output destination.

Figure 2:
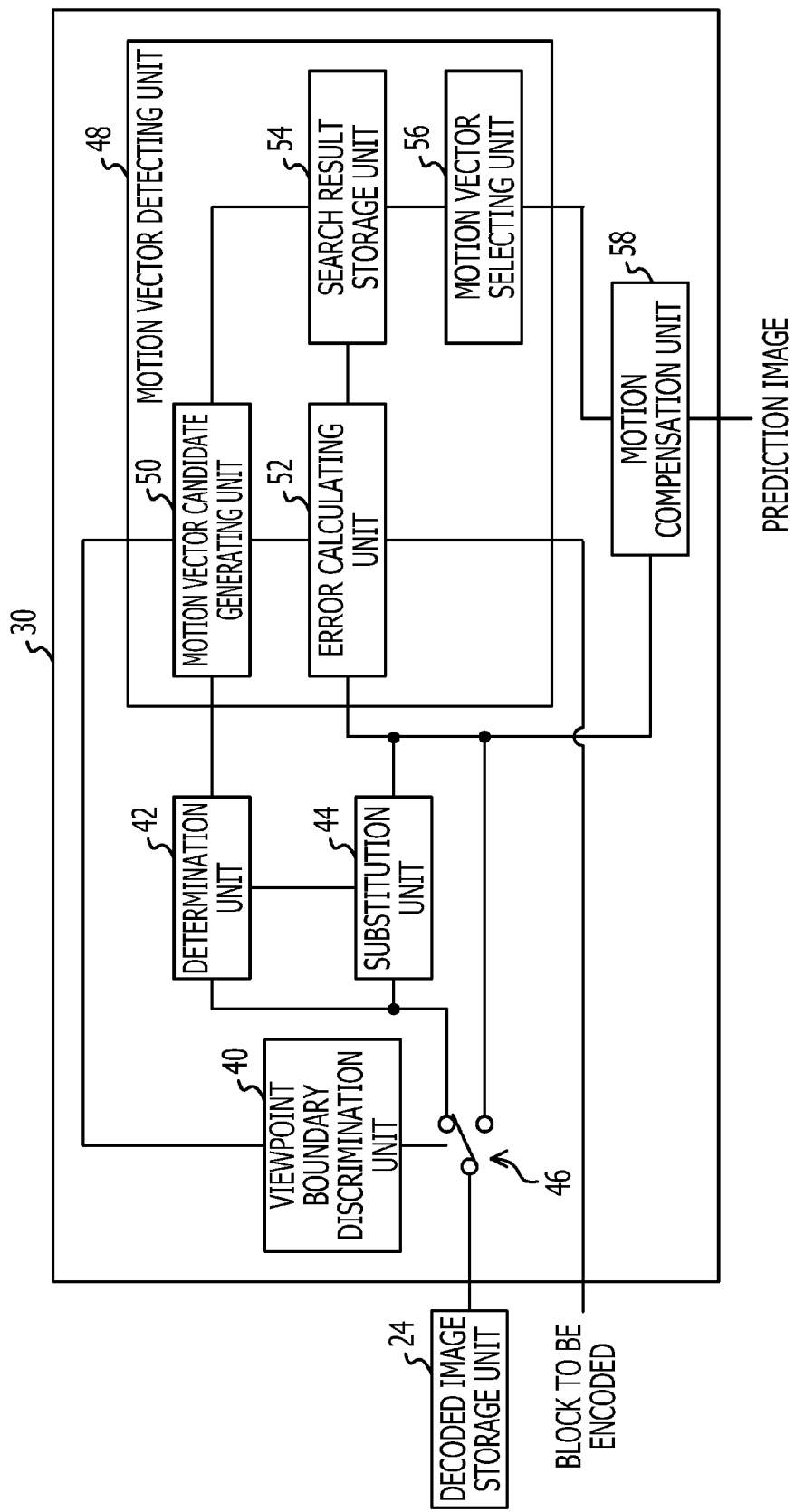
FIG. 2 is a block diagram illustrating the schematic configuration of an inter-screen prediction image generating unit of the encoding device described in the first embodiment.

Next, the inter-screen prediction image generating unit 32 will be described in detail. As illustrated in FIG. 2, the inter-screen prediction image generating unit 30 includes a viewpoint boundary discrimination unit 40, a determination unit 42, a substitution unit 44, a changeover switch 46, a motion vector detecting unit 48, and a motion compensation unit 58. The motion vector detecting unit 48 detects a motion vector at the time of encoding the encoded block (a motion vector to be used at the time of generating a prediction image by motion compensation regard the encoded block). Also, the motion vector detecting unit 48 includes a motion vector candidate generating unit 50, an error calculating unit 52, a search result storage unit 54, and a motion vector selecting unit 56. Outline regarding the function units will be described below.

With the motion vector candidate generating unit 50, multiple reference blocks spatially approximated to the encoded block are extracted from decoded images (reference images) temporally approximated to a frame image to which the encoded block belongs supplied form the decoded image storage unit 24. The extraction range of reference blocks in a decoded image is determined according to the position of the encoded block within the frame to be encoded. Accordingly, though drawing is omitted here, the position information of the encoded block is also input to the motion vector candidate generating unit 50. The motion vector candidate generating unit 50 generates a motion vector indicating relative positional relations (shift amount and shift direction) between the extracted reference block and the encoded block as a motion vector candidate. Of these candidates, the motion vector of the encoded block is finally selected by a later-described motion vector selecting unit 56.

The information of the motion vector candidates extracted at the motion vector candidate generating unit 50 is input to the viewpoint boundary discrimination unit 40. The viewpoint boundary discrimination unit 40 discriminates whether or not each of the reference blocks corresponding to the motion vector candidates straddles a boundary between the image for the right eye and the image for the left eye of the reference image.

In the event that a reference block corresponding to a motion vector candidate is a reference block straddling the above boundary, the viewpoint boundary discrimination unit 40 controls the changeover switch 46 in a first state so as to perform substitution processing at the substitution unit 44. Upon the changeover switch 46 becoming the first state, the decoded image is supplied to both of the determination unit 42 and substitution unit 44. Note that, hereafter, a reference block straddling the above boundary will be referred to as a boundary block.

Also, in the event that a reference block corresponding to a motion vector candidate is not a boundary block, the viewpoint boundary discrimination unit 40 controls the changeover switch 46 in a second state so as not to perform substitution processing. Thus, the decoded image is not supplied to the determination unit 42 and substitution unit 44, and is directly supplied to the motion vector detecting unit 48 and motion compensation unit 58. Accordingly, substitution processing is not carried on a reference block which is not the boundary block.

The determination unit 42 determines correlation height with the image of the encoded block regarding each of the image of a first area corresponding to the image for the left eye and the image of a second area corresponding to the image for the right eye included in the boundary block corresponding to a motion vector candidate. This determination is performed based on local information relating to the encoded block.

The substitution unit 44 performs substitution processing for substituting a substitution image generated using the pixel values of an area determined to be high in correlation with the image of encode block for the image of an area determined to be low in correlation with the image of the encoded block of the image of the first area and the image of the second area. Note that the substitution processing is not performed on the original decoded image stored in the memory by the decoding image storage unit 24, and is performed on the decoded image copied to a predetermined temporal storage unit for example. The image information of the decoded image after the substitution processing is supplied to the motion vector detecting unit 48 and motion compensation unit 58.

Note that a method for generating a substitution image is not restricted to particular one. For example, an arrangement may be made wherein of the pixels values of one area having high correlation, a substitution image is generated using only the pixel values of a portion adjacent to another area, and this substitution image is substituted for the image of the other area. More specifically, of the pixel values of one area, a substitution image generated by arraying a pixel string adjacent to the other area for the worth of length of the horizontal direction of the other area may be substituted for the image of the other area. Also, for example, in the event that the sizes of the two areas are equal, the entire image of one area having high correlation may be substituted for the image of the other area as a substitution image. In the event that the sizes of the two areas differ, a substitution image may be created by enlarging/reducing the image of one area having high correlation in the horizontal direction, and substituted for the image of the other area.

Note that it may also be said that the substitution processing is, in other words, extrapolation processing for obtaining, based on the pixel values of one of the areas, the pixel values of the other area which is an area other than the one of the areas. Accordingly, hereafter, the substitution processing may also be referred to as "extrapolation processing".

In the event that determination is made that the image of the first area is higher in correlation than the second area, substitution processing for substituting a substitution image employing the pixel values of the first area for the image of the second area is performed. The extrapolation direction in this case is a direction from the first area toward the second area.

Also, in the event that determination is made that the image of the second area is higher in correlation than the first area, substitution processing for substituting a substitution image employing the pixel values of the second area for the image of the first area is performed. The extrapolation direction in this case is a direction from the second area toward the first area.

In this way, the extrapolation direction of the substitution processing (extrapolation processing) to be performed at the substitution unit 44 is determined according to the determination result of the determination unit 42.

The error calculating unit 52 calculates each of the images of the reference block determined to be a motion vector candidate at the motion vector candidate generating unit 50, and error (cost) as to the image of the encoded block. Note that in the event that the reference block corresponds to the boundary block, with calculation of error here, the image subjected to the substitution processing is employed.

The search result storage unit 54 correlates the information of the calculated error (cost) with the information of a motion vector candidate corresponding to this error, and stores in the memory.

The motion vector selecting unit 56 selects a motion vector candidate which minimizes the error as a motion vector as to the encoded block being processed now. The information of this motion vector is supplied to the motion compensation unit 58, and also supplied to the entropy encoding unit 34 as side information as described above.

The motion compensation unit 58 generates a prediction image by performing motion compensation using the finally selected motion vector. Specifically, the motion compensation unit 58 extracts the image of a reference block within the decoded image following the motion vector supplied from the motion vector selecting unit 56, and outputs the image information thereof as the image information of a prediction image. Note that in the event that the reference block extracted here corresponds to the boundary block, the image subjected to the substitution processing is taken as a prediction image.

Now, the operations of the determination unit 42 and substitution unit 44 according to the present embodiment will briefly be described with reference to FIG. 3.

Though the determination unit 42 determines correlation height as to the image of the encoded block regarding each of the image of the first area and the image of the second area based on local information relating to the encoded block, with the present embodiment, the following information is employed as local information relating to the encoded block.

1. The decoded pixel values of a peripheral area N1 encoded prior to an encoded block, having a predetermined positional relation as to this encoded block, within a frame image to be encoded.

2. The pixel values of a peripheral area N2 of which the positional relation as to a boundary block is equal to the positional relation as to an encoded block of the peripheral area N1 of the encoded block, within a decoded image.

It goes without saying that the pixel values of the peripheral area N2 are decoded pixel values. Note that, with the present embodiment, though the peripheral area N1 is taken as an area adjacent to the encoded block, this area may not be adjacent to the encoded block as long as this area is an area around the encoded block (e.g., an area within a predetermined range from the encoded block) and has a predetermined positional relation as to the encoded block. Also, the peripheral area N2 is also the same as the peripheral area N1, and may not be adjacent to the encoded block.

The determination unit 42 first obtains similarity r1 between the pixel values of an area C corresponding to the image for the left eye within the peripheral area N2 of the boundary block, and the decoded pixel values of an area c corresponding to the above area C, within the peripheral area N1 of the decoded block.

Next, the determination unit 42 obtains similarity r2 between the pixel values of an area D corresponding to the image for the right eye within the peripheral area N2 of the boundary block, and the decoded pixel values of an area d corresponding to the above area D, within the peripheral area N1 of the decoded block.

In the event that the similarity r1 is higher than the similarity r2, the determination unit 42 makes determination that an area A corresponding to the image for the left eye of the boundary block is higher in correlation with the pixel values of the encoded block than an area B corresponding to the image for the right eye of the boundary block (determination result 1).

Also, in the event that the similarity r2 is higher than the similarity r1, the determination unit 42 makes determination that the area B corresponding to the image for the right eye of the boundary block is higher in correlation with the pixel values of the encoded block than the area A corresponding to the image for the left eye of the boundary block (determination result 2).

In the event that the determination result of the determination unit 42 is the determination result 1, the substitution unit 44 performs extrapolation in the extrapolation direction from the area A toward the area B. Also, in the event that the determination result of the determination unit 42 is the determination result 2, the substitution unit 44 performs extrapolation in the extrapolation direction from the area B toward the area A. In FIG. 3, the extrapolation direction from the area A toward the area B is exemplified.

Next, a specific example of the operation at the inter-screen prediction image generating unit 30 according to the present embodiment will be described in detail with reference to the flowchart in FIG. 4.

With the motion vector detecting unit 48 of the inter-screen prediction image generating unit 30, in order to detect the optimal motion vector regarding the encoded block, as described above, multiple reference blocks are extracted, and multiple motion vector candidates are obtained beforehand. Next, difference between each of the reference blocks corresponding to the multiple candidates and the encoded block is obtained, and in general, a motion vector which minimizes the difference is employed. As for a search method at this time, an algorithm such as the diamond search or hexagon search or the like has been known.

Now, let us say that the upper left position of the encoded block is (x_tar, y_tar), block width is w_block, block height is h_block, frame image width is w_pic, and frame image height is h_pic. The packing method of the image for the left eye and the image for the right eye is taken as the side-by-side method, and a boundary between the image for the left eye and the image for the right eye is taken as a position of w_pic/2 in the horizontal direction (width direction of a frame image).

Figure 4:
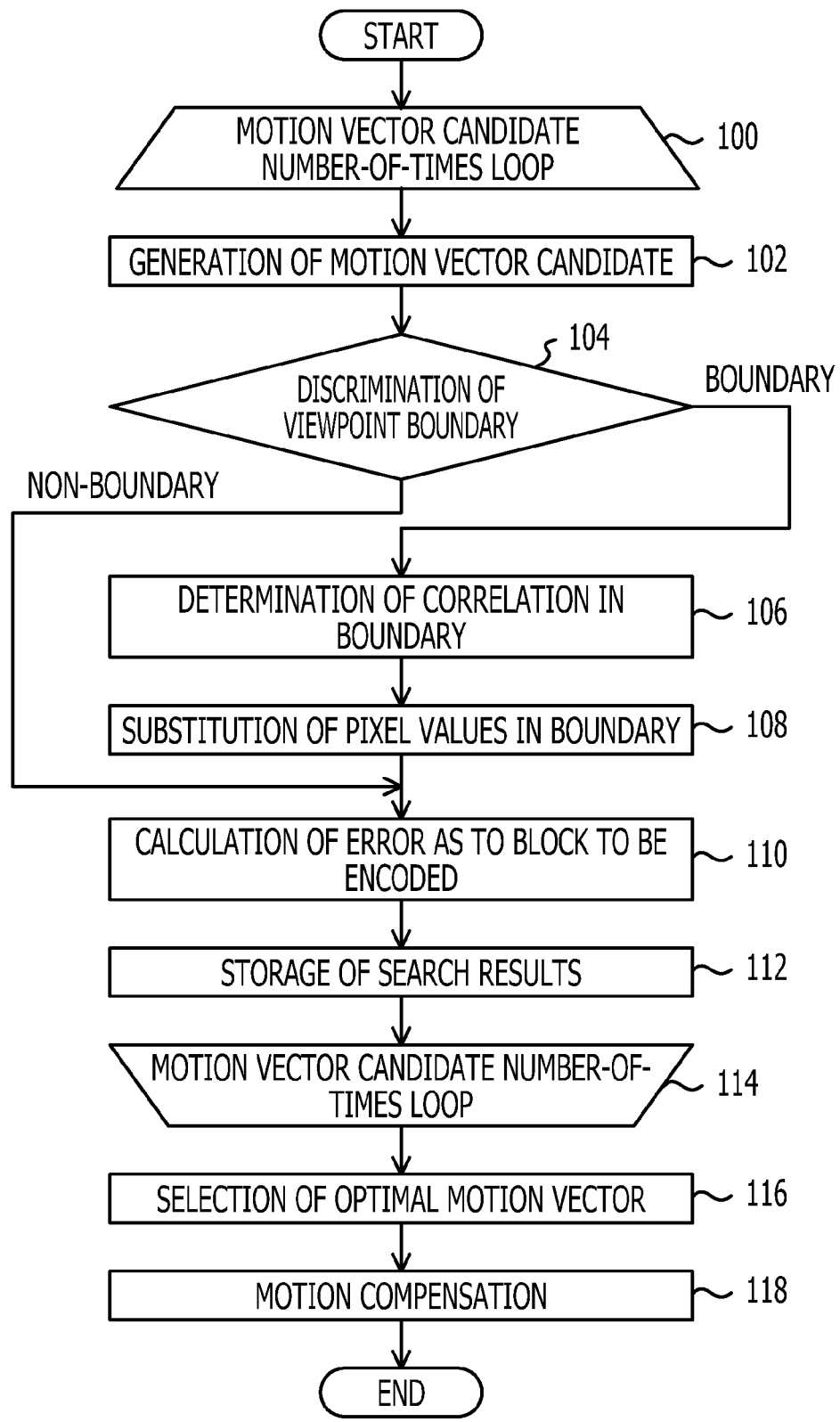
FIG. 4 is a flowchart illustrating the flow of prediction image generating processing to be performed at the encoding devices described in the first embodiment through a third embodiment.

With the flowchart illustrated in FIG. 4, processing sandwiched by loop ends illustrated in step 100 and step 114 is repeated by the number of the motion vector candidates.

First, in step 102, the motion vector candidate generating unit 50 generates a motion vector (mv_x, mv_y) serving as a candidate.

In step 104, the viewpoint boundary discrimination unit 40 performs discrimination of a viewpoint boundary regarding the reference block corresponding to the generated motion vector. That is to say, the viewpoint boundary discrimination unit 40 discriminates whether or not the reference block straddles the boundary between the image for the left eye and the image for the right eye of the decoded image. A condition for straddling the boundary may be represented with the following Expression (1).

$$x\_tar+mv\_x < w\_pic/2 < x\_tar+mv\_x+w\_block \quad (1)$$

Though extrapolation processing is performed on the reference block discriminated to straddle the boundary by the viewpoint boundary discrimination unit 40, extrapolation processing is not performed on the reference block discriminated not to straddle the boundary.

Accordingly, in the event that determination is made in step 104 that the reference block straddles the boundary, in step 106 the determination unit 42 performs determination of correlation, and performs selection of the extrapolation direction in this reference block (boundary block). Here, as described with reference to FIG. 3, the sum of absolute differences of each of a portion according to the image for the left eye and a portion according to the image for the right eye is calculated between the decoded pixel values of the peripheral area N1 of the encoded block, and the decoded pixel values of the peripheral area N2 of the reference block, and the sizes thereof are compared.

It may be conceived that the pixel values of an area decoded for reference already encoded around the encoded block are high in correlation with pixels values near an area having a high correlation with the encoded block within the boundary block of peripheral areas of the boundary block. Therefore, with the present embodiment, the sum of absolute differences between the pixel values of the area c around the encoded block in FIG. 3 and the pixel values of the area C around the boundary block, and the sum of absolute differences between the pixel values of the area d around the encoded block and the pixel values of the area D around the boundary block are compared. The extrapolation direction is determined so as to be extrapolated in the other area using the pixel values of an image including an area of which the sum of absolute differences is smaller of the areas C and D. In this way, with the present embodiment, the extrapolation direction is determined locally and adaptively.

Now, let us say that the widths of the peripheral area N1 and peripheral area N2 are w_periph. In this case, an area S_tar_l according to the image for the left eye of an image decoded after the motion prediction of the peripheral area N1 of the encoded block (equivalent to the area c in FIG. 3) may be represented with the following Expression (2), and an area S_tar_r according to the image for the right eye (equivalent to the area d in FIG. 3) may be represented with the following Expression (3).

$$S\_tar\_l = \{x,y | (x\_tar-w\_periph < x < x\_tar \&\& y\_tar- h\_block < y < y\_tar) \| (x\_tar-w\_periph < x < x\_tar+ w\_bound \&\& y\_tar < y < y\_tar+w\_periph)\} \quad (2)$$

$$S\_tar\_r = \{x,y | (x\_tar-w\_bound < x < x\_tar+ x\_block \&\& y\_tar < y < y\_tar+w\_periph)\} \quad (3)$$

Also, an area S_ref_l according to the image for the left eye of the peripheral area N2 of the boundary block (equivalent to the area C in FIG. 3) may be represented with the following Expression (4), and an area S_ref_r according to the image for the right eye (equivalent to the area D in FIG. 3) may be represented with the following Expression (5).

$$S\_ref\_l = \{x,y | (x\_tar+mv\_x-w\_periph < x < x\_tar+ mv\_x \&\& y\_tar+mv\_y-h\_block < y < y\_tar+mv\_y) \| (x\_tar+mv\_x-w\_periph < x < w\_pic/2 \&\& y\_tar+ mv\_y < y < y\_tar+mv\_y+w\_periph)\} \quad (4)$$

$$S\_ref\_r = \{x,y | (w\_pic/2 < x < x\_tar+mv\_x+ x\_block \&\& y\_tar+mv\_y < y < y\_tar+mv\_y+w\_p- eriph)\} \quad (5)$$

Note that, with the above Expressions, (x, y) represents a pixel position. Also, let us say that && represents AND (logical AND), and || represents OR (logical OR).

Also, here, width w_bound from the left end of the boundary block to the viewpoint boundary may be represented with the following Expression (6).

$$w\_bound = w\_pic/2 - (x\_tar+mv\_x) \quad (6)$$

Also, let us say that the decoded pixel values of the peripheral area N1 of the encoded block are I_tar(x, y), and the pixel values of the peripheral area N2 of the boundary block are I_ref(x, y). The sum of absolute differences diff_left of a portion according to the image for the left eye of both, and the sum of absolute differences diff_right of a portion according to the image for the right eye may be calculated as indicated with the following Expressions (7) and (8).

diff_left=(1/N_left)
$$\{\Sigma\_\{y=0\}^\{y=h\_block\} \Sigma\_\{x=0\}^\{x=w\_periph\} |I\_tar(x\_ tar-w\_periph+x, y\_tar-h\_block+y) - I\_ref(x\_tar+ mv\_x-w\_periph+x, y\_tar+mv\_y-h\_block+y)| + \Sigma\_\{y=0\}^\{y=w\_periph\} \Sigma\_\{x=0\}^\{x=w\_bound\} |I\_tar(x\_ tar-w\_periph+x, y\_tar+y) - I\_ref(x\_tar+mv\_x- w\_periph+x, y\_tar+mv\_y+y)|\} \quad (7)$$

diff_right=(1/N_right)
$$\{\Sigma\_\{y=0\}^\{y=w\_periph\} \Sigma\_\{x=0\}^\{x=w\_block- w\_bound\} |I\_tar(x\_tar+w\_bound+x, y\_tar+y) - I\_ref(x\_tar+w\_bound+mv\_x+x, y\_tar+mv\_y+y) \quad (8)$$

Note that y=start and y=end as represented with "Σ_{y=start}^{y=end}" represents up and down subscripts of the summation notation E, and indicates that a range that the variable y may represent is from start to end. Accordingly, for example, in the event of Σ_{y=0}^{y=h_block}, o through h_block is a range that the variable y may represent. Also, here, variables N_left and N_right are the number of pixels of each area, and are used for normalization.

In the event of comparing the sum of absolute differences diff_left of a portion according to the image for the left eye, and the sum of absolute differences diff_right of a portion according to the image for the right eye to determine correlation with the pixel values of the encoded block, and obtaining the extrapolation direction, this is specifically represented as follows.

For example, in the event that diff_left<diff_right, determination is made that the portion according to the image for the left eye (area A in FIG. 3) is higher in correlation of pixel values, and accordingly, the extrapolation direction is determined so as to be extrapolated from the left to right using the pixel values of the image for the left eye. Conversely, in the event that diff_left >diff_right, determination is made that the portion according to the image for the right eye (area B in FIG. 3) is higher in correlation of pixel values, and accordingly, the extrapolation direction is determined so as to be extrapolated from the right to left using the pixel values of the image for the right eye. Determination may be made wherein the smaller the sum of absolute differences is, the higher similarity is, and the higher similarity is, the higher correlation is. Accordingly, here, the extrapolation direction is determined so as be extrapolated from an area where similarity is higher to an area where similarity is lower.

In the event that the number of pixels of one area of the areas A and B is excessively small, reliability of difference absolute values is lowered, and accordingly, a threshold for the number of pixels may be set at the determination unit 42 so as to be extrapolated from an area where the number of pixels is great to an area where the number of pixels is small.

In step 108, the substitution unit 44 performs extrapolation processing (substitution processing) of the boundary block in accordance with the above determination result of the determination unit 42. Note that the extrapolation processing has to be performed in the extrapolation direction determined by the determination result of the determination unit 42, and accordingly, the extrapolation method is not restricted to particular one. Accordingly, description regarding a specific extrapolation method will be omitted here. Hereafter, as an example, a case will be described where pixel values adjacent to the boundary of an area where correlation is higher are simply copied to an area where correlation is lower. Also, if we say that the extrapolation direction is from the left to right direction, and the pixel values of the extrapolated boundary block are I_ref(x, y), the processing results may be represented with the following Expressions (9) and (10).

$$I\_ref(x,y)=I\_ref(x,y)[mv\_x+x\_tar<x<w\_pic/2] \quad (9)$$

$$I\_ref(x,y)=I\_ref(w\_pic/2-1,y)[w\_pic/2<x<w\_block+mv\_x+x\_tar] \quad (10)$$

In step 110, the error calculating unit 52 performs, as described above, error calculation between the encoded block and the reference block. Note that in the event that discrimination is made in step 104 that the reference block does not straddle the boundary, the processes in steps 106 and 108 are not performed, and error calculation in step 110 is performed. Specifically, in the event that discrimination is made in step 104 that the reference block straddles the boundary, the error calculating unit 52 performs error calculation between the reference block and the encoded block in a state in which the extrapolation has been performed. Also, in the event that discrimination is made in step 104 that the reference block does not straddle the boundary, the error calculating unit 52 performs error calculation between the reference block and the encoded block in a state in which no extrapolation has been performed. Difference diff is represented with the following Expression (11).

$$\text{diff}=\Sigma\_\{y=0\}^{\{y=h\_block\}}\Sigma\_\{x=0\}^{\{x=w\_block\}}|I\_tar(x\_tar+x, y\_tar+y)-I\_ref(x\_tar+x+mv\_x, y\_tar+y+mv\_y)| \quad (11)$$

In step 112, the above obtained error and motion vector are correlated and stored in the memory by the search result storage unit 54.

Processes in steps 102 through 112 are carried out regarding the reference block corresponding to each motion vector candidate.

In step 116, the motion vector selecting unit 56 performs selection of the optimal motion vector. In general, a vector which provides the minimum error is selected as the optimal motion vector.

Next, in step 118, the motion compensation unit 58 generates a prediction image by performing motion compensation from the decoded image to be referenced based on the selected optimal motion vector. At this time, in the event that the optimal motion vector specifies the image of the reference block discriminated to straddle the boundary in step 104, the motion compensation unit 58 outputs the image of the reference block in a state in which extrapolation has been performed, as a prediction image. Also, in the event that the optimal motion vector specifies the image of the reference block discriminated not to straddle the boundary in step 104, the motion compensation unit 58 outputs the image of the reference block in a state in which no extrapolation has been performed, as a prediction image.

Note that, with the above example, though description has been made regarding an example wherein the sum of absolute differences is calculated as a method for calculating similarity, the method is not restricted to this, and another method may be employed such as calculating a correlation coefficient.

Next, a specific example will be described regarding a decoding device 70 corresponding to the above encoding device 10. The decoding device 70 also performs processing in increments of blocks in the same way as with the encoding device 10. Hereafter, a block to be decoded in a frame image to be decoded of which the entire has not been decoded (played) yet will be referred to as decoded block. Also, description will be made by simply referring an already decoded and played frame image as decoded image, thereby distinguishing this from a frame image to be decoded.

Figure 5:
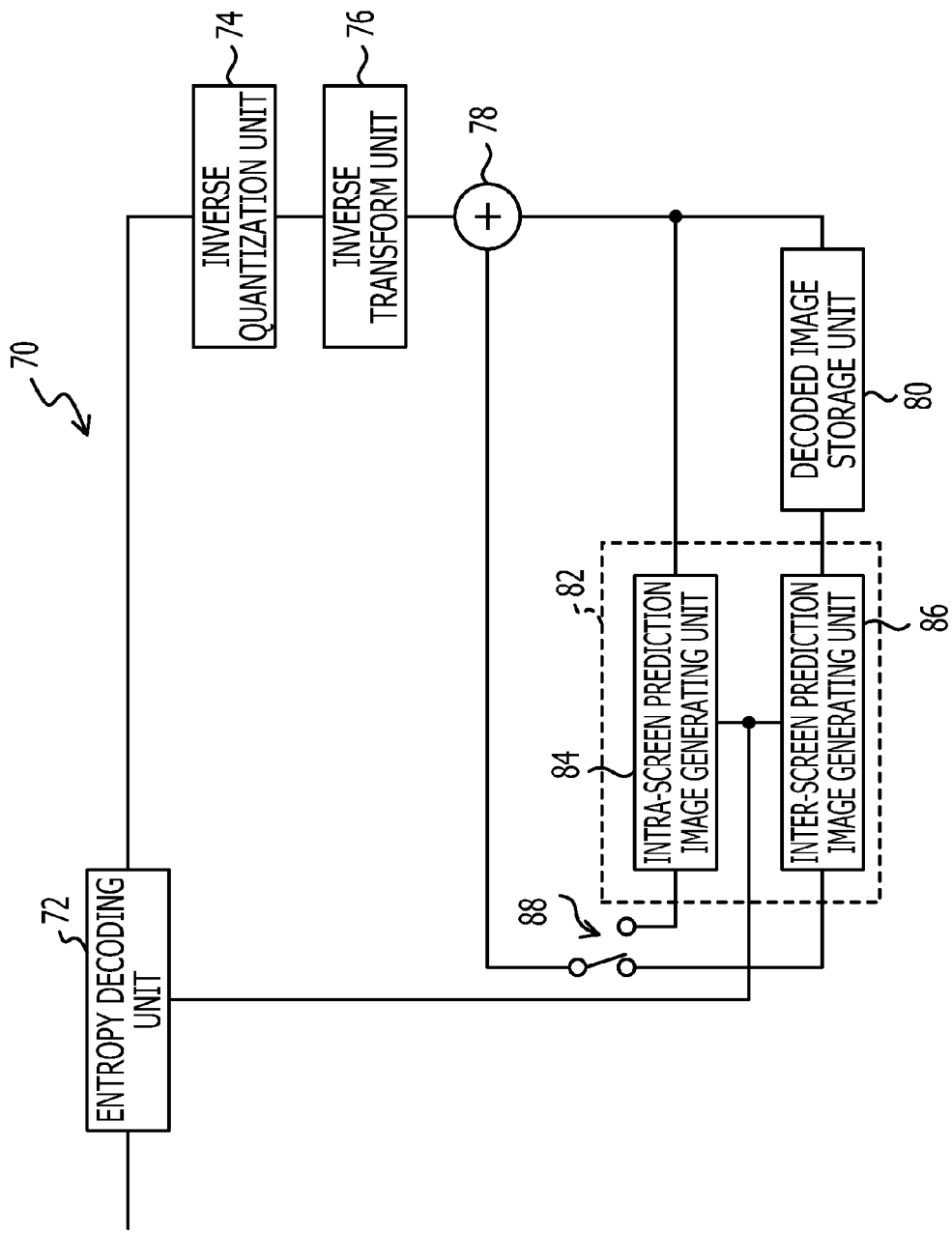
FIG. 5 is a block diagram illustrating the schematic configuration of a decoding device described in the first embodiment.

FIG. 5 illustrates the decoding device 70 according to the present embodiment. The decoding device 70 includes an entropy decoding unit 72, an inverse quantization unit 74, an inverse transform unit 76, a decoded image generating unit 78, a decoded image storage unit 80, a decoded block prediction image generating unit 82, and a changeover switch 88.

Note that the function units in the decoding device 70 are realized by, e.g., electronic circuits and so forth, and the decoding device 70 may be realized by, e.g., semiconductor integrated circuits, and more specifically, an ASIC (Application Specific Integrated Circuit) and so forth. Also, the decoding device 70 may further include an operating unit which is an input device which accepts operation input by a user.

Outline regarding the function units in the decoding device 70 will be described below.

The entropy decoding unit 72 subjects an encoded signal (bit stream) encoded at the encoding device 10 to entropy decoding (variable length decoding), and outputs a quantization coefficient of a prediction error image and side information. Entropy decoding mentioned here means processing for returning variable length code to the original signal according to the appearance frequency of symbols. The decoded quantization coefficient is supplied to the inverse quantization unit 74, and the decoded side information is supplied to the decoded block prediction image generating unit 82.

The inverse quantization unit 74 subjects the quantization coefficient decoded at the entropy decoding unit 72 to inverse quantization (scaling), and outputs playback frequency coefficient. The inverse quantization unit 74 performs scaling, and accordingly generates a playback frequency coefficient by returning the quantization coefficient of the compressed frequency to the original scale, and supplied to the inverse transform unit 76.

The inverse transform unit 76 subjects the playback frequency coefficient supplied from the inverse quantization unit 74 to inverse transform processing. The inverse transform unit 76 returns the frequency components of the playback frequency coefficient to the original prediction error image (playback prediction error image) by inverse transform processing, and then supplies the playback prediction error image to the decoded image generating unit 78.

The decoded image generating unit 78 adds the prediction image generated by the decoded block prediction image generating unit 82, and the playback prediction error image subjected to decoding processing by the inverse quantization unit 74 and inverse transform unit 76. The image of the added and decoded (played) decoded block (block decoded image) is supplied to the decoded image storage unit 80.

The decoded image storage unit 80 sequentially stores each of the image information of the block decoded images supplied from the decoded image generating unit 78 in the memory. Thus, the decoded image of the entire decoded and played frame image is finally stored. The stored decoded image is supplied to a later-described inter-screen prediction image generating unit 86, and is referenced with motion compensation at the time of decoding another frame image. Accordingly, of the stored decoded images, a decoded image to be referenced at the time of generating a prediction image at the inter-screen prediction image generating unit 30 is referred to as "reference image". Which decoded image is referenced is determined according to the prediction mode and so forth of a frame image to be decoded.

The decoded block prediction image generating unit 82 includes an intra-screen prediction image generating unit 84 and an inter-screen prediction image generating unit 86. The decoded block prediction image generating unit 82 generates a prediction image in increments of blocks based on the side information supplied from the entropy decoding unit 72 and as appropriate the decoded image, and supplies to the decoded image generating unit 78 via the changeover switch 88.

The intra-screen prediction image generating unit 84 generates a prediction image at the time of decoding the encoded data encoded by the intra-screen prediction coding method in increments of blocks based on the side information.

The inter-screen prediction image generating unit 86 generates a prediction image at the time of decoding the encoded data encoded by the inter-screen prediction coding method in increments of blocks based on the side information and decoded image. Specifically, the inter-screen prediction image generating unit 86 generates a prediction image by referencing the pixel values of the reference block within the decoded image indicated with the information of a motion vector included in the side information.

The changeover switch 88 is a switch for selecting one of the prediction image generated at the intra-screen prediction image generating unit 84 and the prediction image generated at the inter-screen prediction image generating unit 86, and supplying to the decoded image generating unit 78. The changeover switch 88 is controlled and switched by the control unit which is not illustrated in the drawing.

Figure 6:
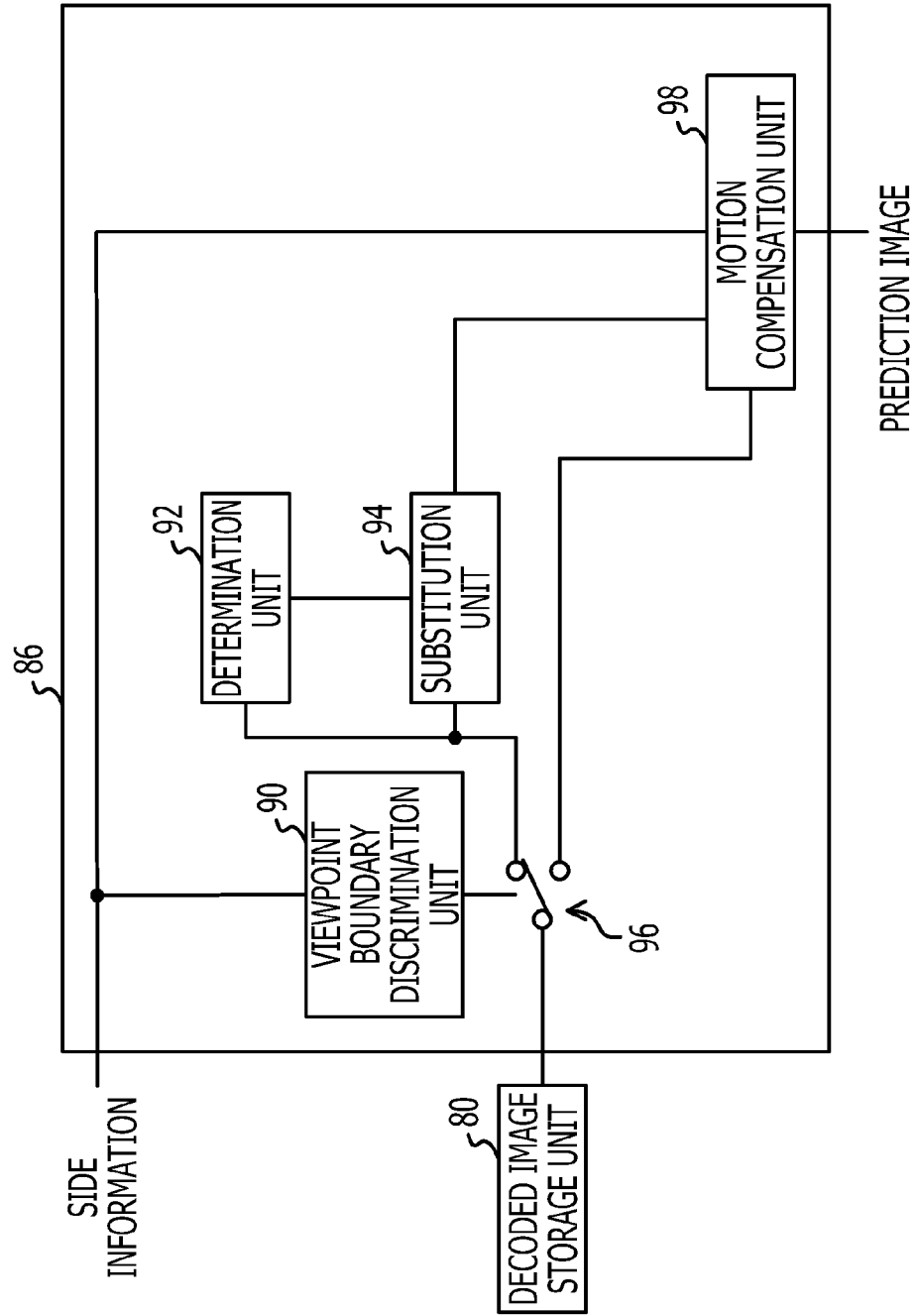
FIG. 6 is a block diagram illustrating the schematic configuration of an inter-screen prediction image generating unit of the decoding device described in the first embodiment.

Next, the inter-screen prediction image generating unit 86 will be described in detail. As illustrated in FIG. 6, the inter-screen prediction image generating unit 86 includes a viewpoint boundary discrimination unit 90, a determination unit 92, a substitution unit 94, a changeover switch 96, and a motion compensation unit 98. Outline regarding the function units will be described below.

The information of the motion vector decoded at the entropy decoding unit 72 is input to the viewpoint boundary discrimination unit 90. The viewpoint boundary discrimination unit 90 discriminates whether or not the reference block that the information of the motion vector indicates straddles the boundary between the image for the right eye and image for the left eye of the reference image.

In the event that the reference block that the information of the motion vector indicates is a reference block straddling the above boundary (boundary block), the viewpoint boundary discrimination unit 90 controls the changeover switch 96 in a first state so as to perform substitution processing at the substitution unit 94. Upon the changeover switch 96 becoming the first state, the decoded image is supplied to both of the determination unit 92 and substitution unit 94.

Also, in the event that the reference block that the information of the motion vector indicates is a boundary block, the viewpoint boundary discrimination unit 90 controls the changeover switch 96 in a second state so as not to perform substitution processing. Thus, the decoded image is not supplied to the determination unit 92 and substitution unit 94 but directly supplied to the motion compensation unit 98. Accordingly, substitution processing is not performed on a reference block which is not a boundary block.

The determination unit 92 determines correlation height as to the image of the decoded block regarding each of the image of a first area corresponding to the image for the left eye included in the boundary block, and the image of a second area corresponding to the image for the right eye based on local information relating to the decoded block. The determination unit 92 determines correlation height using a determination method corresponding to the determination method by the determination unit 42 of the encoding device 10.

In this way, with the decoding device 70, in the event that the reference block that the information of the motion vector regarding the decoded block indicates is a boundary vector, similarity of the pixel values regarding only this reference block is obtained, and correlation is determined.

The substitution unit 94 performs substitution processing for substituting a substitution image generated with the pixel values of an area determined to be high in correlation with the image of the decoded block for the image of an area determined to be low in correlation with the image of the decoded block of the image of the first area and the image of the second area. Note that this substitution processing is also referred to as extrapolation processing in the same way as with the case of the encoding device 10. The substitution unit 94 performs substitution processing by the same way as with the substitution processing to be performed at the substitution unit 44 of the encoding device 10.

The motion compensation unit 98 performs motion compensation based on the information of the motion vector included in the side information decoded by the entropy decoding unit 72 and the supplied decoded image, thereby generating a prediction image. That is to say, the motion compensation unit 98 extracts the image of a reference block within the decoded image in accordance with the supplied motion vector, and outputs this as a prediction image. Note that in the event that the reference block extracted here corresponds to the boundary block, the image subjected to the substitution processing is taken as a prediction image.

Now, the operations of the determination unit 92 and substitution unit 94 according to the present embodiment will briefly be described with reference to FIG. 3. However, description will be made by substituting the frame image to be decoded for the frame image to be encoded illustrated in FIG. 3, and substituting the decoded block for the encoded block. Reference symbols N1, N2, A through D, c, and d in the drawing will be used without change.

The determination unit 92 of the decoding device 70 uses the following pixel values as local information relating to the decoded block at the time of determination of correlation.

1. The decoded pixel values of a peripheral area N1 decoded prior to a decoded block, having a predetermined positional relation as to this decoded block, within a frame image to be decoded.
2. The pixel values of a peripheral area N2 of which the positional relation as to a boundary block is equal to the positional relation as to a decoded block of the peripheral area N1 of the decoded block, within a decoded image to be decoded prior to a frame image including a decode block and to be referenced at the time of motion compensation.

The determination unit 92 first obtains similarity r1 between the pixel values of an area C corresponding to the image for the left eye within the peripheral area N2 of the boundary block, and the decoded pixel values of an area c corresponding to the above area C, within the peripheral area N1 of the decoded block.

Next, the determination unit 92 obtains similarity r2 between the pixel values of an area D corresponding to the image for the right eye within the peripheral area N2 of the boundary block, and the decoded pixel values of an area d corresponding to the above area D, within the peripheral area N1 of the decoded block.

In the event that the similarity r1 is higher than the similarity r2, the determination unit 92 makes determination that an area A corresponding to the image for the left eye of the boundary block is higher in correlation with the pixel values of the decoded block than an area B corresponding to the image for the right eye of the boundary block (determination result 1).

Also, in the event that the similarity r2 is higher than the similarity r1, the determination unit 92 makes determination that the area B corresponding to the image for the right eye of the boundary block is higher in correlation with the pixel values of the decoded block than the area A corresponding to the image for the left eye of the boundary block (determination result 2).

In the event that the determination result of the determination unit 92 is the determination result 1, the substitution unit 94 performs extrapolation in the extrapolation direction from the area A of the boundary block toward the area B. Also, in the event that the determination result of the determination unit 92 is the determination result 2, the substitution unit 94 performs extrapolation in the extrapolation direction from the area B of the boundary block toward the area A.

Figure 7:
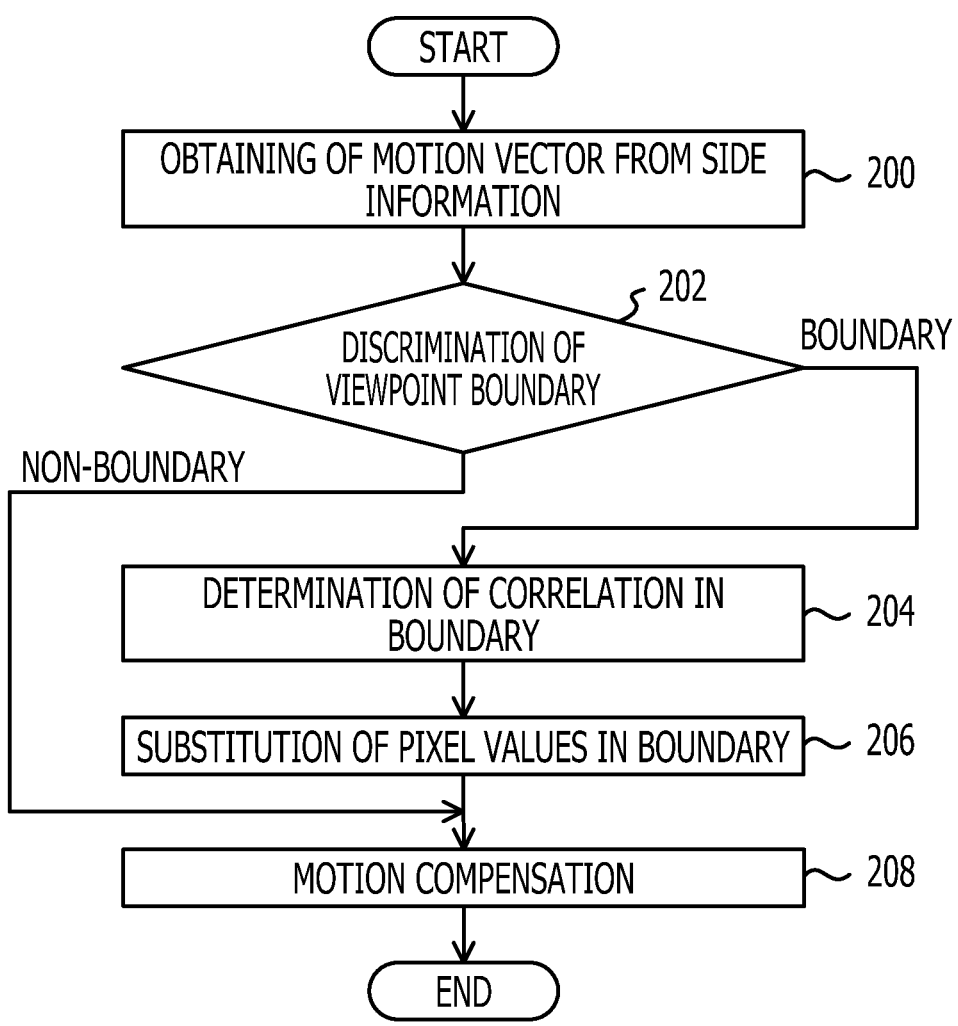
FIG. 7 is a flowchart illustrating the flow of prediction image generating processing to be performed at the decoding devices described in the first through the third embodiments.

Next, a specific example of the operation at the inter-screen prediction image generating unit 86 according to the present embodiment will be described in detail with reference to the flowchart in FIG. 7.

Now, let us say that the upper left position of the decoded block is (x_tar, y_tar), block width is w_block, block height is h_block, frame image width is w_pic, and frame image height is h_pic. The packing method of the image for the left eye and the image for the right eye is taken as the side-by-side method, and a boundary between the image for the left eye and the image for the right eye is taken as a position of w_pic/2 in the horizontal direction (width direction of a frame image).

In step 200, the viewpoint boundary discrimination unit 90 obtains the information of a motion vector (mv_x, mv_y) included in the side information decoded at the entropy decoding unit 72 regarding a decoded block to be decoded.

In step 202, the viewpoint boundary discrimination unit 90 performs discrimination of a viewpoint boundary regarding the reference block indicated by the obtained motion vector. That is to say, the viewpoint boundary discrimination unit 90 discriminates whether or not the reference block straddles a boundary between the image for the left eye and the image for the right eye of a decoded image. A condition for straddling the boundary may be represented with the following Expression (12).

$$x\_tar+mv\_x<w\_pic/2<x\_tar+mv\_x+w\_block \quad (12)$$

Though extrapolation processing is performed on the reference block discriminated to straddle the boundary by the viewpoint boundary discrimination unit 90, extrapolation processing is not performed on the reference block discriminated not to straddle the boundary.

Accordingly, in the event that discrimination is made in step 202 that the reference block straddles the boundary, in step 204 the determination unit 92 performs determination of correlation to select the extrapolation direction in this reference block (boundary block). Here, as described with reference to FIG. 3, the sum of absolute differences of each of a portion according to the image for the left eye and a portion according to the image for the right eye is calculated between the decoded pixel values of the peripheral area N1 of the decoded block, and the decoded pixel values of the peripheral area N2 of the boundary block, and compares the sizes thereof.

Figure 3:
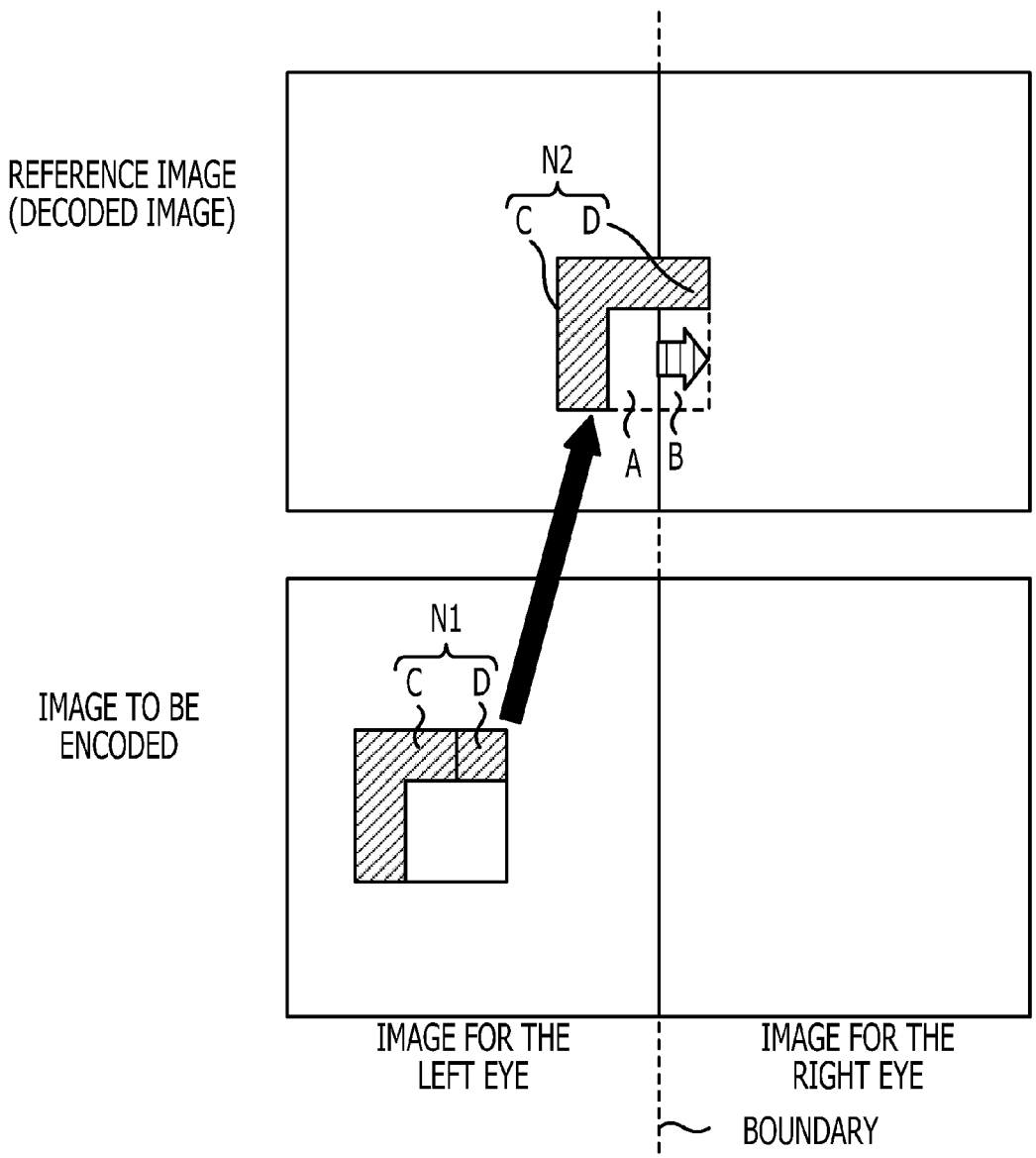
FIG. 3 is an explanatory diagram for describing correlation determination processing according to the first embodiment.

More specifically, with the present embodiment, the sum of absolute differences between the pixel values of the area c around the decoded block in FIG. 3 and the pixel values of the area C around the boundary block is compared with the sum of absolute differences between the pixel values of the area d around the decoded block and the pixel values of the area D around the boundary block. The extrapolation direction is then determined so as to be extrapolated in the other area using the pixel values of an image including an area of which the sum of absolute differences is smaller of the areas C and D. In this way, with the present embodiment, the extrapolation direction is determined locally and adaptively.

Now, let us say that the widths of the peripheral area N1 and peripheral area N2 are w_periph. In this case, an area S_tar_l according to the image for the left eye of an image decoded after the motion compensation of the peripheral area N1 of the decoded block (equivalent to the area c in FIG. 3) may be represented with the following Expression (13), and an area S_tar_r according to the image for the right eye (equivalent to the area d in FIG. 3) may be represented with the following Expression (14).

$$S\_tar\_l=\{x,y|(x\_tar-w\_periph<x<x\_tar\&\&y\_tar-h\_block<y<y\_tar)\|(x\_tar-w\_periph<x<x\_tar+w\_bound\&\&y\_tar<y<y\_tar+w\_periph)\} \quad (13)$$

$$S\_tar\_r=\{x,y|(x\_tar-w\_bound<x<x\_tar+x\_block\&\&y\_tar<y<y\_tar+w\_periph)\} \quad (14)$$

Also, an area S_ref_l according to the image for the left eye of the peripheral area N2 of the boundary block within the decoded image (equivalent to the area C in FIG. 3) may be represented with the following Expression (15), and an area S_ref_r according to the image for the right eye (equivalent to the area D in FIG. 3) may be represented with the following Expression (16).

$$S\_ref\_l=\{x,y|(x\_tar+mv\_x-w\_periph<x<x\_tar+mv\_x\&\&y\_tar+mv\_y-h\_block<y<y\_tar+mv\_y)\| \\ (x\_tar+mv\_x-w\_periph<x<w\_pic/2\&\&y\_tar+mv\_y<y<y\_tar+mv\_y+w\_periph)\} \quad (15)$$

$$S\_ref\_r=\{x,y|(w\_pic/2<x<x\_tar+mv\_x+x\_block\&\&y\_tar+mv\_y<y<y\_tar+mv\_y+w\_periph)\} \quad (16)$$

Also, here, width w_bound from the left end of the boundary block to the viewpoint boundary may be represented with the following Expression (17)

$$w\_bound=w\_pic/2-(x\_tar+mv\_x) \quad (17)$$

Moreover, let us say that the decoded pixel values of the peripheral area N1 of the decoded block are I_tar(x, y), and the pixel values of the peripheral area N2 of the boundary block are I_ref(x, y). The sum of absolute differences diff_left of a portion according to the image for the left eye of both, and the sum of absolute differences diff_right of a portion according to the image for the right eye may be calculated as indicated with the following Expressions (18) and (19).

$$\text{diff\_left}=(1/N\_left) \\ \{\Sigma\_\{y=0\}\^\{y=h\_block\}\Sigma\_\{x=0\}\^\{x=w\_periph\}|I\_tar(x\_tar-w\_periph+x,y\_tar-h\_block+y)-I\_ref(x\_tar+mv\_x-w\_periph+x,y\_tar+mv\_y-h\_block+y)|+ \\ \Sigma\_\{y=0\}\^\{y=w\_periph\}\Sigma\_\{x=0\}\^\{x=w\_bound\}|I\_tar(x\_tar-w\_periph+x,y\_tar+y)-I\_ref(x\_tar+mv\_x-w\_periph+x,y\_tar+mv\_y+y)|\} \quad (18)$$

$$\text{diff\_right}=(1/N\_right) \\ \{\Sigma\_\{y=0\}\^\{y=w\_periph\}\Sigma\_\{x=0\}\^\{x=w\_block-w\_bound\}|I\_tar(x\_tar+w\_bound+x,y\_tar+y)-d \\ I\_ref(x\_tar+w\_bound+mv\_x+x,y\_tar+mv\_y+y) \quad (19)$$

Also, with Expressions (18) and (19) as well, in the same way as with the above Expressions (7) and (8), the variables N_left and N_right are used for normalization (of the number of pixels in each area).

In the event of comparing the sum of absolute differences diff_left of a portion according to the image for the left eye, and the sum of absolute differences diff_right of a portion according to the image for the right eye to determine correlation with the pixel values of the decoded block, and obtaining the extrapolation direction, this is specifically represented as follows.

For example, in the event that diff_left<diff_right, determination is made that the portion according to the image for the left eye (area A in FIG. 3) is higher in correlation of pixel values, and accordingly, the extrapolation direction is determined so as to be extrapolated from the left to right using the pixel values of the image for the left eye. Conversely, in the event that diff_left >diff_right, determination is made that the portion according to the image for the right eye (area B in FIG. 3) is higher in correlation of pixel values, and accordingly, the extrapolation direction is determined so as to be extrapolated from the right to left using the pixel values of the image for the right eye. Determination may be made wherein the smaller the sum of absolute differences is, the higher similarity is, and the higher similarity is, the higher correlation is. Accordingly, here, the extrapolation direction is determined so as be extrapolated from an area where similarity is higher to an area where similarity is lower.

Note that, in the same way as with the case of the encoding device 10, in the event that the number of pixels of one area of the areas A and B is excessively small, reliability of difference absolute values is lowered, and accordingly, a threshold for the number of pixels may be set so as to be extrapolated from an area where the number of pixels is great to an area where the number of pixels is small.

Next, in step 206, the substitution unit 94 performs extrapolation processing (substitution processing) of the boundary block in accordance with the above determination result of the determination unit 92. Note that the extrapolation processing has to be performed in the extrapolation direction determined by the determination result of the determination unit 92, and accordingly, the extrapolation method is not restricted to particular one. Accordingly, description regarding a specific extrapolation method will be omitted here. Hereafter, as an example, a case will be described where pixel values adjacent to the boundary of an area where correlation is higher are simply copied to an area where correlation is lower. Also, if we say that the extrapolation direction is from the left to right direction, and the pixel values of the extrapolated boundary block are I_ref'(x, y), the processing results may be represented with the following Expressions (20) and (21).

$$I\_ref'(x,y)=I\_ref(x,y) \; [mv\_x+x\_tar<x<w\_pic/2] \quad (20)$$

$$I\_ref'(x,y)=I\_ref(w\_pic/2-1,y)[w\_pic/2<x<w\_block+mv\_x+x\_tar] \quad (21)$$

Next, in step 208, the motion compensation unit 98 generates a prediction image by performing motion compensation from the decoded image to be referenced based on the information of the motion vector decoded and obtained at the entropy decoding unit 72. At this time, in the event that the motion vector specifies the image of the reference block discriminated to straddle the boundary in step 202, the motion compensation unit 98 outputs the image of the reference block in a state in which extrapolation has been performed, as a prediction image. Also, in the event that the motion vector specifies the image of the reference block discriminated not to straddle the boundary in step 202, the motion compensation unit 98 outputs the image of the reference block in a state in which no extrapolation has been performed, as a prediction image.

Note that, with the above example, though description has been made regarding an example wherein the sum of absolute differences is calculated as a method for calculating similarity, the method is not restricted to this, and another method may be employed such as calculating a correlation coefficient.

Second Embodiment

Figure 8:
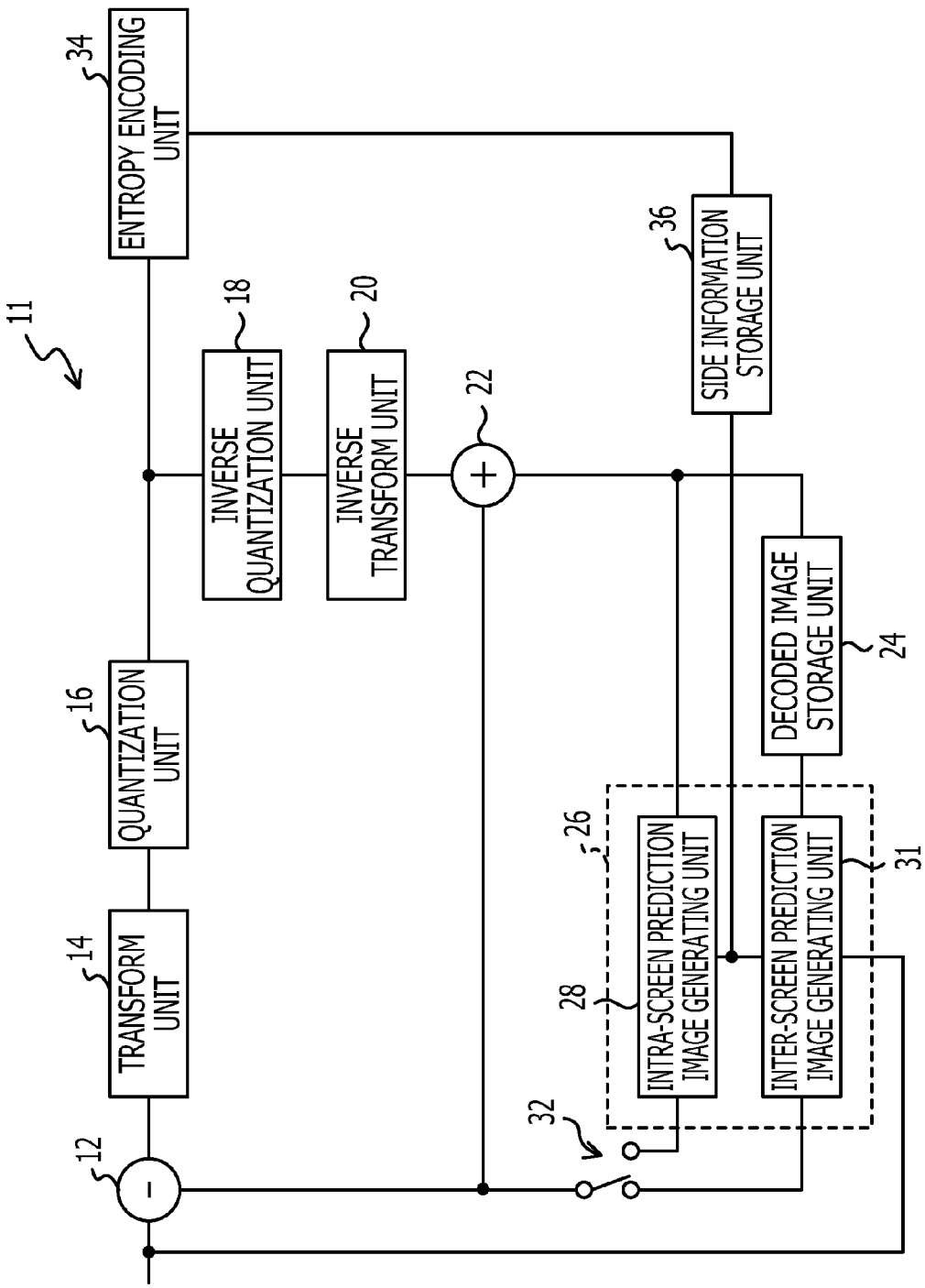
FIG. 8 is a block diagram illustrating the schematic configuration of an encoding device described in a second embodiment.

Next, a second embodiment of the disclosed technology will be described. FIG. 8 illustrates the schematic configuration of an encoding device 11 according to the second embodiment. An inter-screen prediction image generating unit 31 of the encoding device 11 according to the second embodiment illustrated in FIG. 8 uses a motion vector instead of pixel values at the time of determining correlation as to the encoded block of the boundary block unlike the inter-screen prediction image generating unit 30 according to the first embodiment. Accordingly, with the encoding device 11, as illustrated in FIG. 8, in addition to the configuration of the encoding device 10 described in the first embodiment, a side information storage unit 36 for storing side information is provided. The configuration other than this is the same as with the first embodiment, and accordingly, the same portions as with the first embodiment are denoted with the same reference numerals, and description of the configuration thereof will be omitted, and only portions different from the first embodiment will be described.

The side information storage unit 36 stores the information of a motion vector serving as side information detected at the inter-screen prediction image generating unit 31 in the memory.

Figure 9:
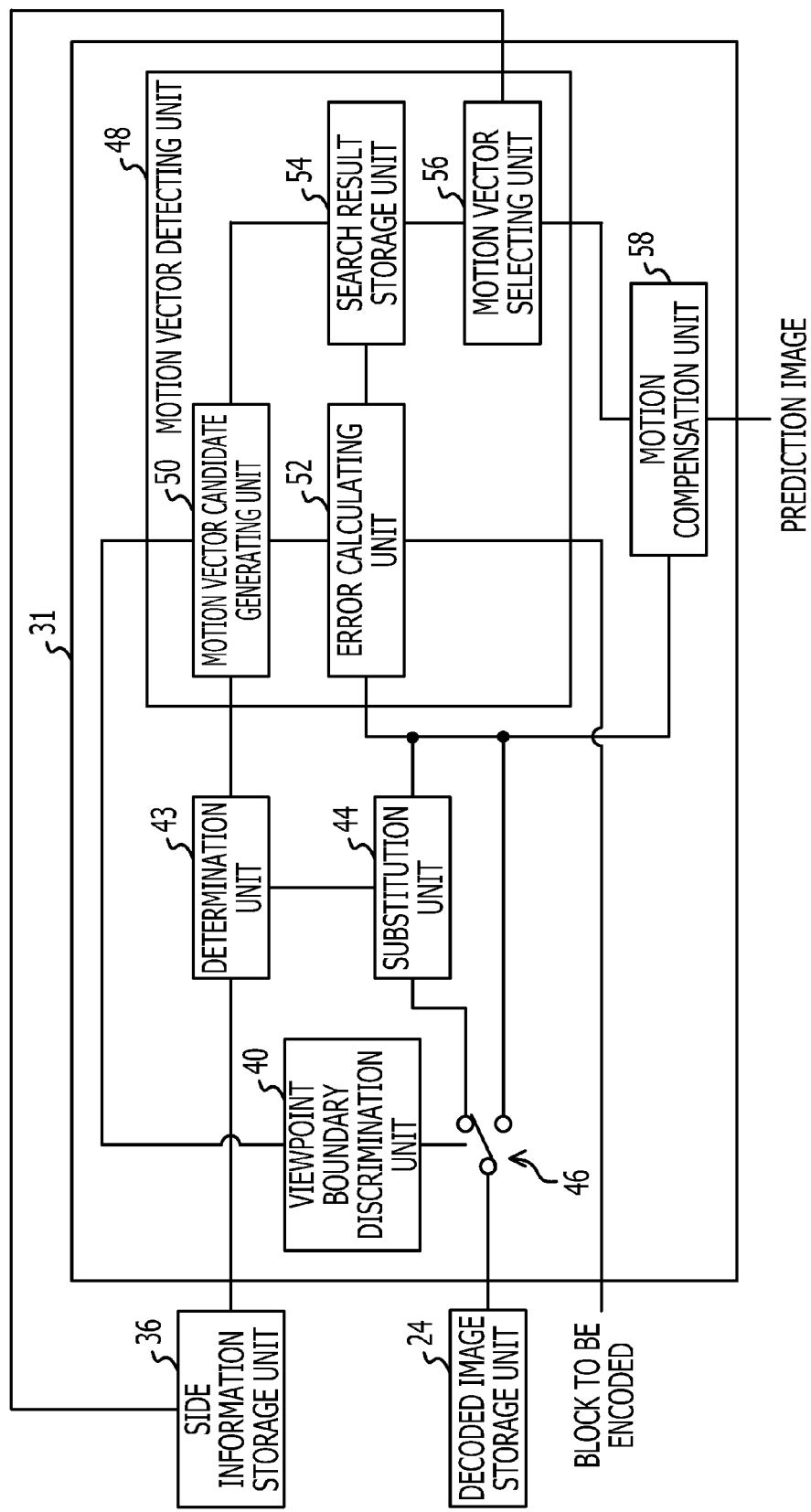
FIG. 9 is a block diagram illustrating the schematic configuration of an inter-screen prediction image generating unit of the encoding device described in the second embodiment.

FIG. 9 illustrates a configuration diagram of the inter-screen prediction image generating unit 31 according to the second embodiment. With the inter-screen prediction image generating unit 31 according to the second embodiment, there is provided a determination unit 43 which determines correlation using a method different from the determination unit 42 according to the first embodiment. A motion vector candidate is supplied from the motion vector candidate generating unit 50 to the determination unit 43 according to the second embodiment, and side information (motion vector) used for motion compensation at the time of encoding the reference block is supplied from the side information storage unit 36. This motion vector to be supplied may also be reworded as a motion vector detected at the motion vector detecting unit 48 at the time of encoding the reference block. Also, the motion vector selecting unit 56 according to the second embodiment supplies not only the selected motion vector to the motion compensation unit 58 but also the side information storage unit 36 to store in the memory. With the inter-screen prediction image generating unit 31, components other than those are the same as with the first embodiment, and accordingly, description thereof will be omitted.

Figure 10:
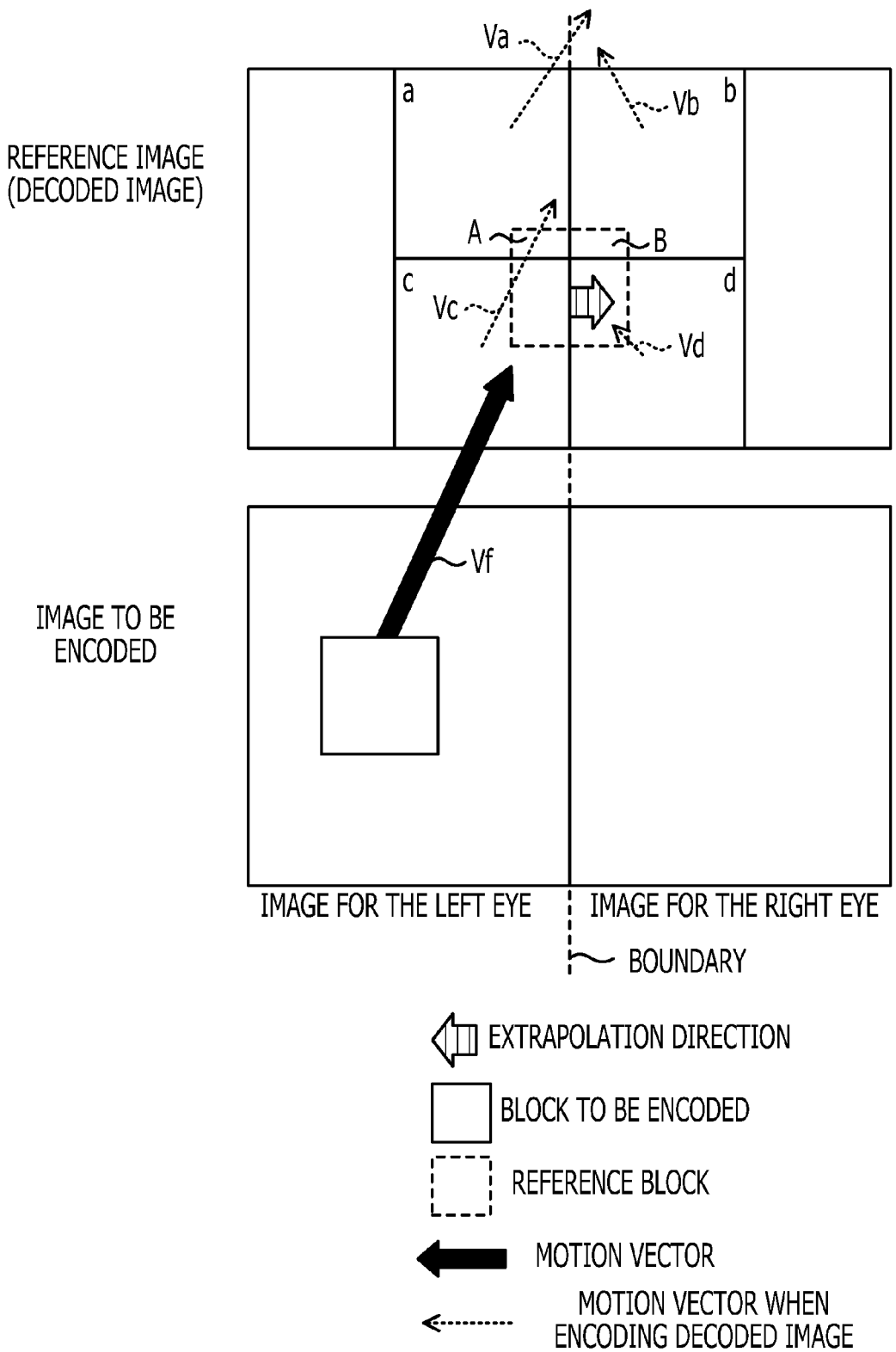
FIG. 10 is an explanatory diagram for describing correlation determination processing according the second embodiment.

Now, the operations of the determination unit 43 and substitution unit 44 according to the present embodiment will briefly be described with reference to FIG. 10. In FIG. 10, an area corresponding to the image for the left eye of a boundary block is illustrated as an area A, and an area corresponding to the image for the right eye is illustrated as an area B.

Though the determination unit 43 also determines correlation height with the image of the encoded block regarding each of the image of the area A and the image of the area B based on local information relating to the encoded block, with the present embodiment, the following information is used as local information relating to the encoded block.

1. A motion vector V12 used for motion compensation at the time of encoding the area A within the boundary block, a motion vector V23 used for motion compensation at the time of encoding the area B within the boundary block, and a motion vector V3 as to the boundary block of the encoded block.

Note that, as is commonly known, the size of a reference block may be changed. In the event that the number of divisions of a decoded image has been changed for increasing a compression ratio, the reference block and a block at the time of encoding this decoded image may not agree, and as illustrated in FIG. 10, the reference block may straddle multiple blocks at the time of encoding a decoded image.

Therefore, a motion vector V1 of the area A of the boundary block may be an average of motion vectors Va and Vc used for motion compensation at the time of encoding multiple blocks overlapped with the area A (blocks a and c in FIG. 10). Also, the motion vector V1 may be taken as a vector Vc of a block c occupying the largest area within the boundary block (the area overlapped with the boundary block is the largest). A motion vector V2 may also be taken as an average of motion vectors Vb and Vd used for motion compensation at the time of encoding multiple blocks overlapped with the area B (blocks b and d in FIG. 10). Also, the motion vector V2 may be taken as a vector Vd of a block d which occupies the largest area within the boundary block.

The determination unit 43 then obtains similarity r1 between a motion vector V1 and a motion vector V3, and similarity r2 between the motion vector V2 and the motion vector V3. Note that the motion vector V3 is a vector indicated with Vf in FIG. 10. Also, though a method for calculating similarity is not restricted to particular one, inner product between the motion vector V1 and the motion vector V3 may be obtained as the similarity r1. This is also true regarding the similarity r2 between the motion vector V2 and the motion vector V3. Note that, with the present embodiment, the motion vector V3 used for determination of correlation at the determination unit 43 is equal to a vector generated as a motion vector candidate at the motion vector candidate generating unit 50.

In the event that the similarity r1 is higher than the similarity r2, the determination unit 43 determines that the area A corresponding to the image for the left eye of the boundary block is higher in correlation with the pixel values of the encoded block than the area B corresponding to the image for the right eye of the boundary block (determination result 1).

Also, in the event that the similarity r2 is higher than the similarity r1, the determination unit 43 determines that the area B corresponding to the image for the right eye of the boundary block is higher in correlation with the pixel values of the encoded block than the area A corresponding to the image for the left eye of the boundary block (determination result 2).

In the event that the determination result of the determination unit 43 is the determination result 1, the substitution unit 44 performs extrapolation in the extrapolation direction from the area A toward the area B of the boundary block. Also, in the event that the determination result of the determination unit 43 is the determination result 2, the substitution unit 44 performs extrapolation in the extrapolation direction from the area B toward the area A of the boundary block.

Next, a specific example of the operation at the inter-screen prediction image generating unit 31 according to the second embodiment will be described in detail with reference to the flowchart in FIG. 4 in the same way as with the first embodiment.

With the motion vector detecting unit 48 of the inter-screen prediction image generating unit 31, in order to detect the optimal motion vector regarding the encoded block, as described in the first embodiment, multiple reference blocks are extracted, and multiple motion vector candidates are obtained beforehand. Next, difference between each of the reference blocks corresponding to the multiple candidates and the encoded block is obtained, and in general, a motion vector which minimizes the difference is employed. As for a search method at this time, an algorithm such as the diamond search or hexagon search or the like has been known.

Now, let us say that the upper left position of the encoded block is (x_tar, y_tar), block width is w_block, block height is h_block, frame image width is w_pic, and frame image height is h_pic. The packing method of the image for the left eye and the image for the right eye is taken as the side-by-side method, and a boundary between the image for the left eye and the image for the right eye is taken as a position of w_pic/2 in the horizontal direction (width direction of a frame image).

With the flowchart illustrated in FIG. 4, processing sandwiched by loop ends illustrated in step 100 and step 114 is repeated by the number of the motion vector candidates.

First, in step 102, the motion vector candidate generating unit 50 generates a motion vector (mv_x, mv_y) serving as a candidate.

In step 104, the viewpoint boundary discrimination unit 40 performs discrimination of a viewpoint boundary regarding the reference block corresponding to the generated motion vector. That is to say, the viewpoint boundary discrimination unit 40 discriminates whether or not the reference block straddles the boundary between the image for the left eye and the image for the right eye. A condition for straddling the boundary may be represented with the following Expression (22).

$$x\_tar+mv\_x<w\_pic/2<x\_tar+mv\_x+w\_block \quad (22)$$

Though extrapolation processing is performed on the reference block discriminated to straddle the boundary by the viewpoint boundary discrimination unit 40, extrapolation processing is not performed on the reference block discriminated not to straddle the boundary.

Accordingly, in the event that determination is made in step 104 that the reference block straddles the boundary, in step 106 the determination unit 43 performs determination of correlation, and performs selection of the extrapolation direction in the boundary block. Here, as described with reference to FIG. 10, similarity between each of the motion vectors V1 and V2 of the boundary block and the motion vector (may also be referred to as motion vector candidate) V3 of the encoded block is obtained, and correlation height is determined.

The direction and size of movement of an object are frequently continued, and there are a few changes in sudden movement. Therefore, in general, a similar motion vector is obtained between the encoded block and reference block (in the event that the reference block is the boundary block, areas having correlation within the boundary block). Therefore, the determination unit 43 compares similarity between the motion vector V1 used at the time of encoding the area A according to the image for the left eye and the motion vector candidate V3, and similarity between the motion vector V2 used at the time of encoding the area B according to the image for the right eye of the boundary block and the motion vector candidate V3. The determination unit 43 then determines an area having higher similarity as a high-correlation area, and determines the extrapolation direction so as to be extrapolated in the other area using the pixel values of an image including the area having higher similarity. In this way, with the present embodiment, the extrapolation direction is determined locally and adaptively.

A method for comparing the similarity between the motion vector candidate V3 and the motion vector V1 used at the time of encoding the area A according to the image for the left eye with the similarity between the motion vector candidate V3 and the motion vector V2 used at the time of encoding the area B according to the image for the right eye is as follows.

Now, let us say that a motion vector candidate is represented as (mv_x, mv_y). An area S_ref_l according to the image for the left eye of the boundary block (equivalent to the area A in FIG. 10) may be represented with the following Expression (23), and an area S_ref_r according to the image for the right eye (equivalent to the area B in FIG. 10) may be represented with the following Expression (24).

$$S\_ref\_l=\{x,y|(x\_tar+mv\_x<x<x\_tar+w\_bound+ \\ mv\_x\&\&y\_tar+mv\_y-h\_block<y<y\_tar+mv\_y)\} \quad (23)$$

$$S\_ref\_r=\{x,y|(x\_tar+mv\_x+w\_bound<x<x\_tar+mv\_x+ \\ x\_block\ \&\&y\_tar-h\_block+mv\_y<y<y\_tar+ \\ mv\_y)\} \quad (24)$$

Note that, of the block decoded image after motion prediction of the encoded block, an area S_tar_l corresponding to the area S_ref_l of the reference block may be represented with the following Expression (25), and an area S_tar_r corresponding to the area S_ref_r of the reference block may be represented with the following Expression (26).

$$S\_tar\_l=\{x,y|(x\_tar<x<x\_tar+w\_bound\&\&y\_tar- \\ h\_block<y<y\_tar)\} \quad (25)$$

$$S\_tar\_r=\{x,y|(x\_tar+w\_bound<x<x\_tar+ \\ x\_block\&\&y\_tar<y<y\_tar-h\_block)\} \quad (26)$$

Also, here, width w_bound from the left end of the boundary block to the viewpoint boundary may be represented with the following Expression (27)

$$w\_bound=w\_pic/2-(x\_tar+mv\_x) \quad (27)$$

With a decoded image, correlation with the encoded block is obtained regarding each of the area S_ref_l and area S_ref_r of the boundary block. Both are the same obtaining method, and accordingly, description will be made here with one area as an example. Now, let us say that the motion vectors used for motion compensation at the time of encoding the multiple blocks overlapped with one area are v_0 through v_n (in FIG. 10, equivalent to the vectors Va and Vc of the block a and c, or equivalent to the vectors Vb and Vd of the blocks b and d).

The above-mentioned motion vector similarity is calculated using these motion vectors. There may be conceived several methods to calculate similarity. For example, as described above, there may be conceived a method for calculating inner product with the average of v_0 through v_n, and a method for calculating inner product with a vector used for motion compensation at the time of encoding a block occupying the largest area within the boundary block. Description will be made here regarding the method for calculating inner product with a vector used for motion compensation at the time of encoding a block occupying the largest area within the boundary block.

Let us say that blocks corresponding to the motion vectors v_0 through v_n are B_0 through B_n, respectively. If we say that of these blocks, the index of a block having the largest area within the boundary block is ilargest, and a function for obtaining the area within the boundary block of this block is f(x), this may be represented as follows.

$$i\_largest=\arg\max(f(B\_i))[i=0\ through\ n]$$

Note that argmax is a function for deriving the index of a block having the largest area of the areas obtained by the function f.

Further, if we say that v_{i_largest}=(mv_ref_x, mv_ref_y), similarity r thereof may be represented with the following Expression (28) by calculation of inner product.

$$r = mv\_x \cdot mv\_ref\_x + mv\_y \cdot mv\_ref\_y \quad (28)$$

According to the above calculation method, there is calculated similarity r_l between the motion vector candidate V3 and the motion vector V1 used for motion compensation at the time of encoding an area according to the image for the left eye, and similarity r_r between the motion vector candidate V3 and the motion vector V2 used for motion compensation at the time of encoding an area according to the image for the right eye.

In the event of determining correlation by comparing the similarity r_l and similarity r_r, and obtaining the extrapolation direction, this will be as follows.

Determination is made that the higher similarity is, the higher correlation is, and accordingly, e.g., in the event that r_l>r_r, determination is made that the portion according to the image for the left eye (area A in FIG. 10) is higher in correlation with pixel values, and the extrapolation direction for performing extrapolation from the left to right using the pixel values of the image for the left eye is determined. Conversely, in the event that r_l<r_r, determination is made that the portion according to the image for the right eye (area B in FIG. 10) is higher in correlation with pixel values, and the extrapolation direction for performing extrapolation from the right to left using the pixel values of the image for the right eye is determined. Accordingly, the extrapolation direction is determined here so as to be extrapolated from the area where similarity is higher to the area where similarity is lower.

The processes in step 108 and thereafter have to be performed in the same way as the processes described in the first embodiment, and accordingly, description exceeding this will be omitted here.

Figure 11:
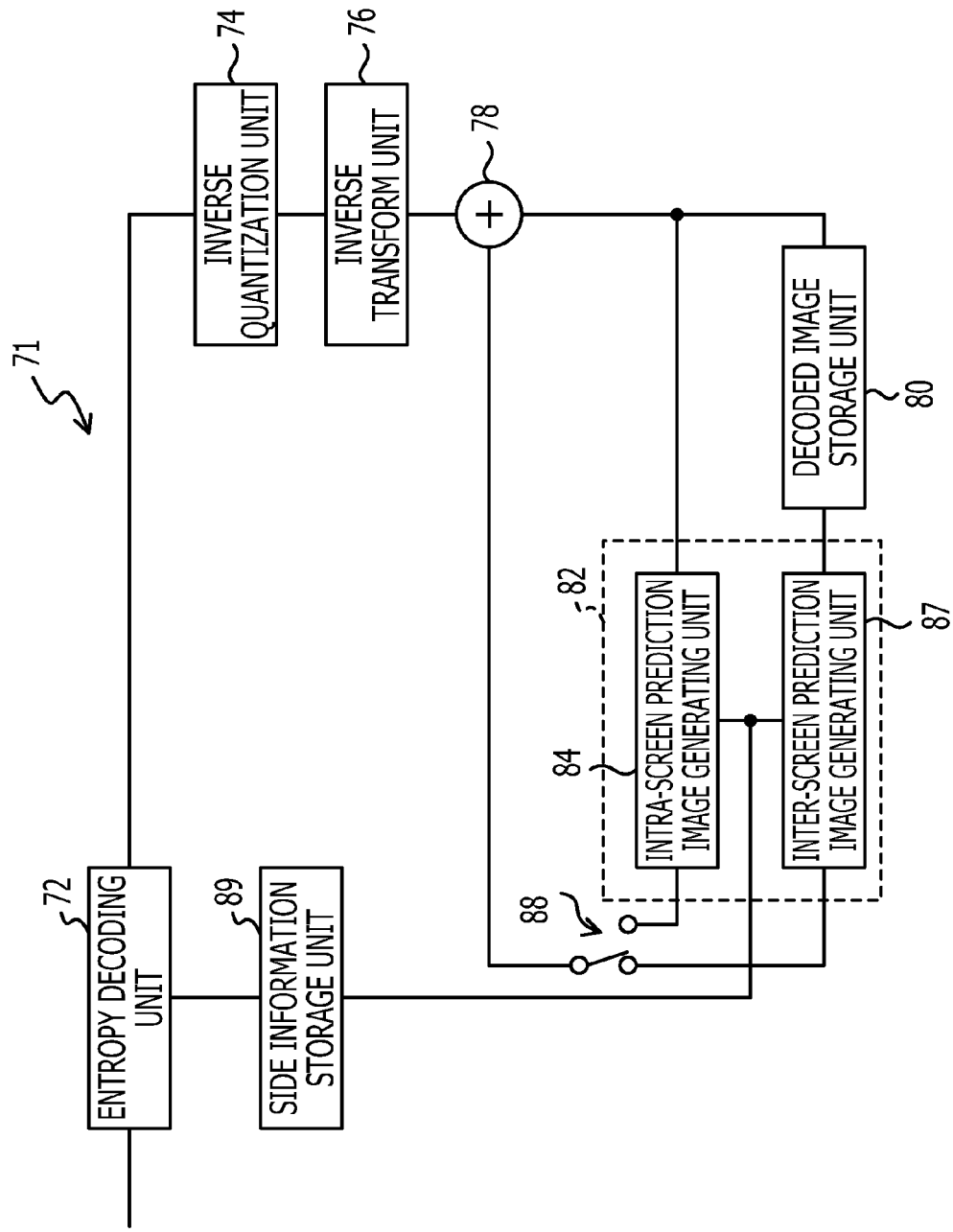
FIG. 11 is a block diagram illustrating the schematic configuration of a decoding device described in the second embodiment.

Next, a decoding device 71 corresponding to the above encoding device 11 will be described with reference to a specific example. FIG. 11 illustrates the schematic configuration of the decoding device 71 according to the second embodiment. The decoding device 71 also performs processing in increments of blocks in the same way as with the encoding device 11. Hereafter, a block to be decoded in a frame image to be decoded of which the entire has not been decoded (played) yet will be referred to as a decoded block. Also, description will be made with an already decoded played frame image being simply referred to as a decoded image, thereby distinguishing from the frame image to be decoded.

An inter-screen prediction image generating unit 87 of the decoding device 71 according to the second embodiment illustrated in FIG. 11 employs a motion vector instead of pixel values at the time of determining correlation as to the encoded block of the boundary block unlike the inter-screen prediction image generating unit 86 according to the first embodiment. Accordingly, with the decoding device 71, as illustrated in FIG. 11, in addition to the configuration of the decoding device 70 described in the first embodiment, a side information storage unit 89 for storing side information is provided. The configuration other than this is the same as with the first embodiment, and accordingly, the same portions as with the first embodiment will be denoted with the same reference numerals, and description of the configuration will be omitted, and only portions different from the first embodiment will be described.

The side information storage unit 89 stores the information of a motion vector serving as side information decoded at the entropy decoding unit 72 in the memory. The stored side information is supplied to the decoded block prediction image generating unit 82.

Figure 12:
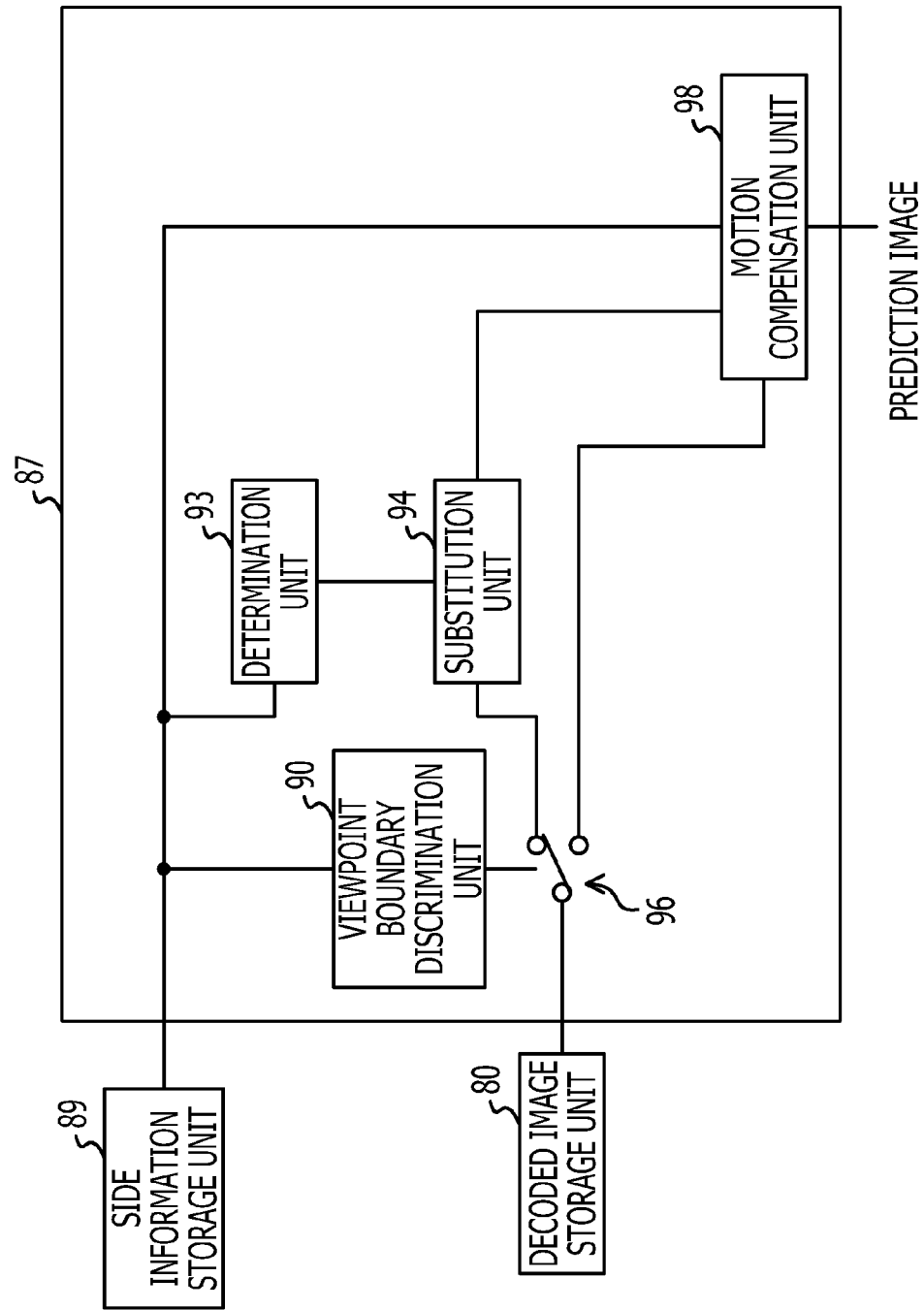
FIG. 12 is a block diagram illustrating the schematic configuration of an inter-screen prediction image generating unit of the decoding device described in the second embodiment.

Next, the inter-screen prediction image generating unit 87 will be described in detail. As illustrated in FIG. 12, with the inter-screen prediction image generating unit 87 according to the second embodiment, there is provided a determination unit 93 for determining correlation using a method different from the determination unit 92 according to the first embodiment. The determination unit 93 determines correlation height using a determination method corresponding to the determination method by the determination unit 43 of the encoding device 11. Side information (motion vector) used for motion compensation at the time of encoding the reference block is supplied from the side information storage unit 89 to the determination unit 93 according to the second embodiment. Note that, with the viewpoint boundary discrimination unit 90 as well, as described above, the side information of the decoded block is input, as described in the first embodiment, determination is made whether or not the reference block that the information of a motion vector included in the side information indicates is the boundary block. Note that, with the inter-screen prediction image generating unit 87, components other than those are the same as with the first embodiment, and accordingly, description thereof will be omitted.

Now, the operations of the determination unit 93 and substitution unit 94 according to the second embodiment will briefly be described with reference to FIG. 10. However, description will be made here by substituting the frame image to be decoded for the frame image to be encoded illustrated in FIG. 10, and substituting the decoded block for the encoded block.

The determination unit 93 of the decoding device 71 according to the second embodiment uses the following pixel values as local information relating to the decoded block at the time of determination of correlation.

1. A motion vector V12 used for motion compensation at the time of encoding the area A within the boundary block, a motion vector V23 used for motion compensation at the time of encoding the area B within the boundary block, and a motion vector V3 as to the boundary block of the decoded block.

The obtain methods of the motion vectors V1 and V2 are as described above. The determination unit 93 obtains similarity r1 between the motion vector V1 and the motion vector V3, and similarity r2 between the motion vector V2 and the motion vector V3. As for the method for calculating similarity, the method calculated at the determination unit 43 of the encoding device 11 may be employed.

In the event that the similarity r1 is higher than the similarity r2, the determination unit 93 determines that the area A corresponding to the image for the left eye of the boundary block is higher in correlation with the pixel values of the decoded block than the area B corresponding to the image for the right eye of the boundary block (determination result 1).

Also, in the event that the similarity r2 is higher than the similarity r1, the determination unit 93 determines that the area B corresponding to the image for the right eye of the boundary block is higher in correlation with the pixel values of the decoded block than the area A corresponding to the image for the left eye of the boundary block (determination result 2).

In the event that the determination result of the determination unit 93 is the determination result 1, the substitution unit 94 performs extrapolation in the extrapolation direction from the area A toward the area B of the boundary block. Also, in the event that the determination result of the determination unit 93 is the determination result 2, the substitution unit 94 performs extrapolation in the extrapolation direction from the area B toward the area A of the boundary block. Now, let us say that the substitution unit 94 performs substitution processing in the same method as the substitution processing to be performed at the substitution unit 44 of the encoding device 11.

Next, a specific example of the operation at the inter-screen prediction image generating unit 87 according to the second embodiment will be described in detail with reference to the flowchart in FIG. 7 in the same way as with the first embodiment.

Now, let us say that the upper left position of the decoded block is (x_tar, y_tar), block width is w_block, block height is h_block, frame image width is w_pic, and frame image height is h_pic. The packing method of the image for the left eye and the image for the right eye is taken as the side-by-side method, and a boundary between the image for the left eye and the image for the right eye is taken as a position of w_pic/2 in the horizontal direction (width direction of a frame image).

In step 200, the viewpoint boundary discrimination unit 90 obtains the information of a motion vector (mv_x, mv_y) included in the side information decoded at the entropy decoding unit 72 regarding the decoded block to be decoded via the side information storage unit 89.

In step 202, the viewpoint boundary discrimination unit 90 performs discrimination of a viewpoint boundary regarding the reference block corresponding to the obtained motion vector. That is to say, the viewpoint boundary discrimination unit 90 discriminates whether or not the reference block straddles the boundary between the image for the left eye and the image for the right eye of multiple images. A condition for straddling the boundary may be represented with the following Expression (29).

$$x\_tar+mv\_x<w\_pic/2<x\_tar+mv\_x+w\_block \quad (29)$$

Though extrapolation processing is performed on the reference block discriminated to straddle the boundary by the viewpoint discrimination unit 90, extrapolation processing is not performed on the reference block discriminated not to straddle the boundary.

Accordingly, in the event that determination is made in step 202 that the reference block straddles the boundary, in step 204 the determination unit 93 performs determination of correlation, and performs selection of the extrapolation direction in this reference block (boundary block). Here, as described with reference to FIG. 10, correlation height is determined by obtaining the similarity r1 between the motion vector V1 and the motion vector V3, and the similarity r2 between the motion vector V2 and the motion vector V3. An area having higher similarity is determined to be higher in correlation, and a substitution image is created using the pixel values of this area, and is substituted for the image of the other area.

As described above, the direction and size of movement of an object are frequently continued, and there are a few changes in sudden movement. Therefore, in general, a similar motion vector is obtained between the decoded block and reference block (in the event that the reference block is the boundary block, areas having correlation within the boundary block). Therefore, the determination unit 43 compares similarity between each motion vector of each area of the boundary block and a motion vector of the decoded block, whereby which area has correlation with the decoded block may be estimated, and the extrapolation direction may be determined locally adaptively.

An area S_ref_l according to the image for the left eye (equivalent to the area A in FIG. 10) of the reference block with the decoded image may be represented with the following Expression (30), and an area S_ref_r according to the image for the right eye (equivalent to the area B in FIG. 10) may be represented with the following Expression (31).

$$S\_ref\_l=\{x,y|(x\_tar+mv\_x<x<x\_tar+w\_bound+mv\_x\&\&y\_tar+mv\_y-h\_block\leq y<y\_tar+mv\_y)\} \quad (30)$$

$$S\_ref\_r=\{x,y|(x\_tar+mv\_x+w\_bound<x<x\_tar+mv\_x+x\_block \&\&y\_tar-h\_block+mv\_y<y<y\_tar+mv\_y)\} \quad (31)$$

Also, of the decoded image after motion prediction of the decoded block, an area S_tar_l corresponding to the area S_ref_l of the reference block may be represented with the following Expression (32), and an area S_tar_r corresponding to the area S_ref_r of the reference block may be represented with the following Expression (33).

$$S\_tar\_l=\{x,y|(x\_tar<x<x\_tar+w\_bound\&\&y\_tar-h\_block\leq y<y\_tar)\} \quad (32)$$

$$S\_tar\_r=\{x,y|(x\_tar+w\_bound<x<x\_tar+x\_block\&\&y\_tar<y<y\_tar-h\_block)\} \quad (33)$$

Also, here, width w_bound from the left end of the boundary block to the viewpoint boundary may be represented with the following Expression (34)

$$w\_bound=w\_pic/2-(x\_tar+mv\_x) \quad (34)$$

Correlation with the decoded block is obtained regard to each of the area S_ref_l and area S_ref_r of the boundary block. Both are the same obtaining method, and accordingly, description will be made here with one area as an example. Now, let us say that the motion vectors used for motion compensation at the time of encoding the multiple blocks overlapped with one area are v_0 through v_n (in FIG. 10, equivalent to the vectors Va and Vc of the block a and c, or equivalent to the vectors Vb and Vd of the blocks b and d).

The above-mentioned motion vector similarity is calculated using these motion vectors. There may be conceived several methods to calculate similarity. For example, as described above, there may be conceived a method for calculating inner product with the average of v_0 through v_n, and a method for calculating inner product with a vector used for motion compensation at the time of encoding a block occupying the largest area within the boundary block. Description will be made here regarding the method for calculating inner product with a vector used for motion compensation at the time of encoding a block occupying the largest area within the boundary block.

Let us say that blocks corresponding to the motion vectors v_0 through v_n are B_0 through B_n, respectively. If we say that of these blocks, the index of a block having the largest area within the boundary block is ilargest, and a function for obtaining the area of this block is f(x), this may be represented as follows.

$$i\_largest=\arg\max(f(B\_i))[i=0 \text{ through } n]$$

Note that argmax is a function for deriving the index of a block having the largest area of the areas obtained by the function f.

Further, if we say that v_{i_largest}=(mv_ref_x, mv_ref_y), similarity r thereof may be represented with the following Expression (35) by calculation of inner product.

$$r=mv\_x\cdot mv\_ref\_x+mv\_y\cdot mv\_ref\_y \quad (35)$$

According to the above calculation method, there is calculated similarity r_l between the motion vector V3 and the motion vector V1 used for motion compensation at the time of encoding an area according to the image for the left eye, and similarity r_r between the motion vector V3 and the motion vector V2 used for motion compensation at the time of encoding an area according to the image for the right eye.

In the event of determining correlation by comparing the similarity r_l and similarity r_r, and obtaining the extrapolation direction, this will be as follows.

For example, in the event that r_l>r_r, determination is made that the portion according to the image for the left eye (area A in FIG. 10) is higher in correlation with pixel values, and accordingly, the extrapolation direction is determined so as to be extrapolated from the left to right using the pixel values of the image for the left eye. Conversely, in the event that r_l<r_r, determination is made that the portion according to the image for the right eye (area B in FIG. 10) is higher in correlation with pixel values, and accordingly, the extrapolation direction is determined so as to be extrapolated from the right to left using the pixel values of the image for the right eye. Determination may be made wherein the higher similarity is, the higher correlation is. Accordingly, the extrapolation direction is determined here so as to be extrapolated from the area where similarity is higher to the area where similarity is lower.

The processes in step 206 and thereafter have to be performed in the same way as the processes described in the first embodiment, and accordingly, description exceeding this will be omitted here.

Third Embodiment

Figure 13:
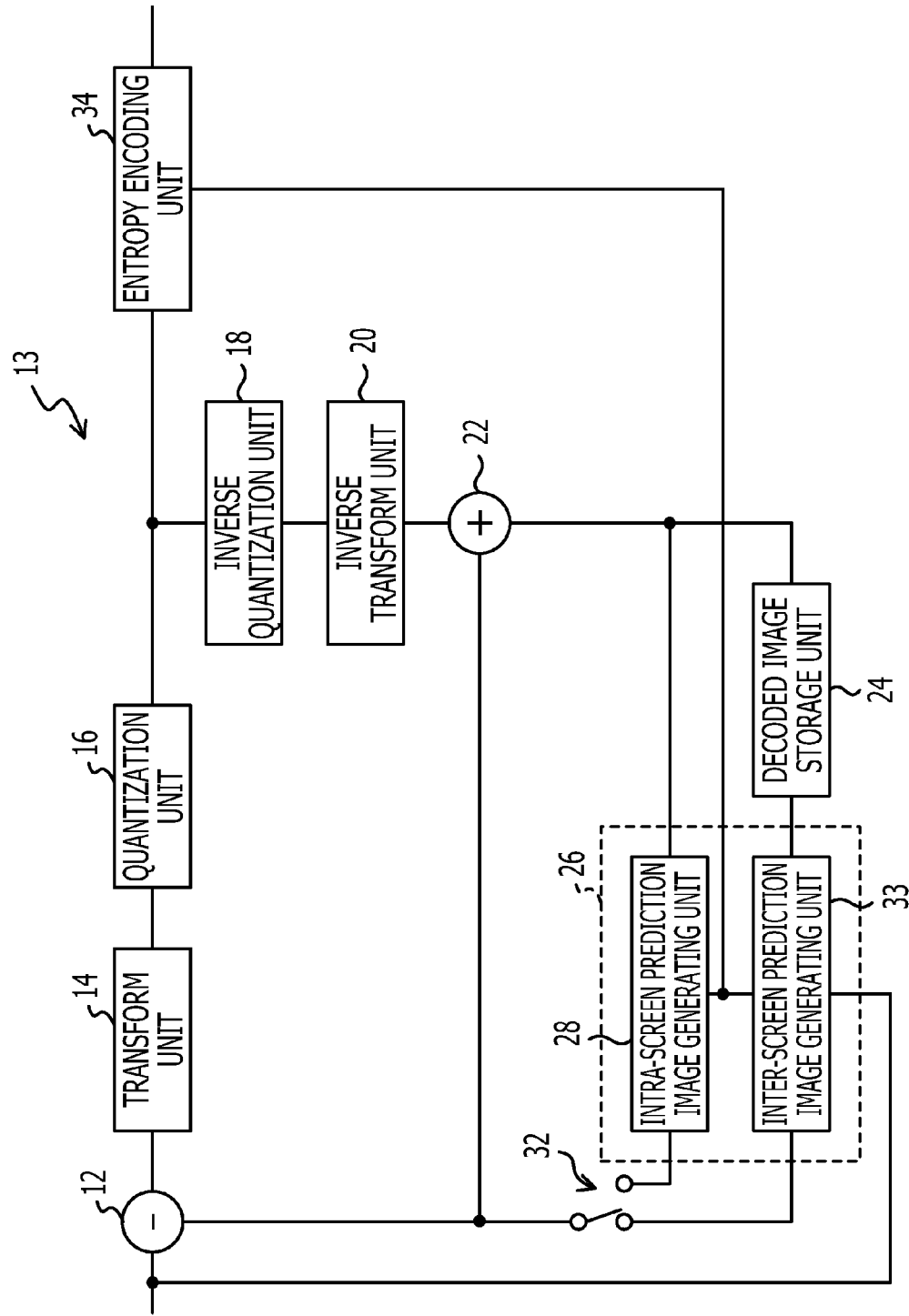
FIG. 13 is a block diagram illustrating the schematic configuration of an encoding device described in a third embodiment.
Figure 14:
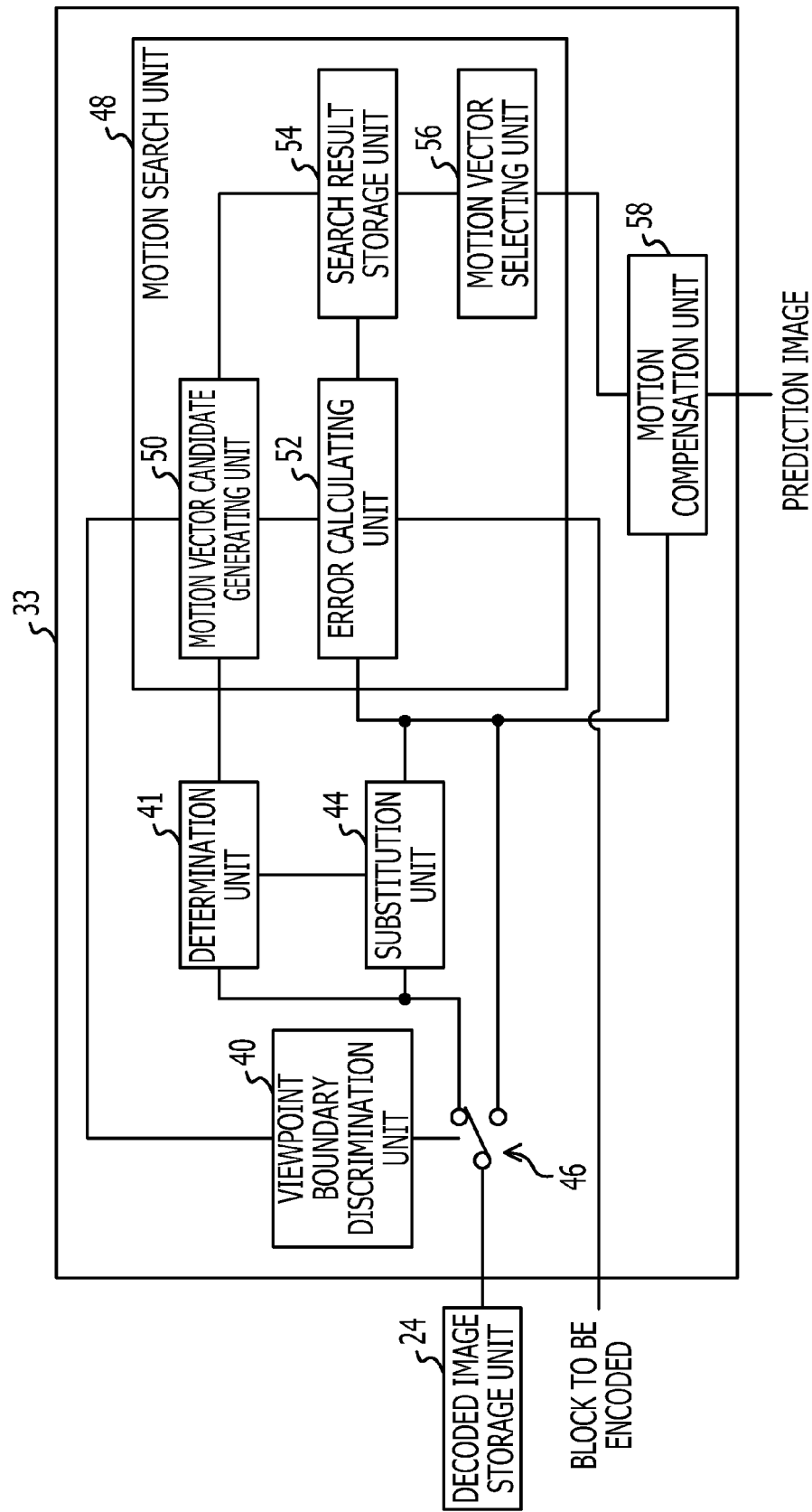
FIG. 14 is a block diagram illustrating the schematic configuration of an inter-screen prediction image generating unit of the encoding device described in the third embodiment.

Next, a third embodiment of the disclosed technology will be described. FIG. 13 illustrates an encoding device 13 according to the third embodiment. A component different from the first embodiment is an inter-screen prediction image generating unit 33. With the inter-screen prediction image generating unit 33 according to the third embodiment, as illustrated in FIG. 14, there is provided a determination unit 41 which determines correlation using a determination method different from the determination unit 42 according to the first embodiment. The determination unit 41 according to the third embodiment uses the position information of the encoded block at the time of determining correlation. The configuration other than this is the same as with the first embodiment, and accordingly, the same portions as with the first embodiment are denoted with the same reference numerals, and description of the configuration thereof will be omitted, and only portions different from the first embodiment will be described.

Now, the operations of the determination unit 41 and substitution unit 44 according to the present embodiment will briefly be described with reference to FIG. 15.

The determination unit 41 determines correlation height with the image of the encoded block regarding each of the image of the area A and the image of the area B of the boundary block based on local information relating to the encoded block, in the same way as with the first embodiment. However, with the present embodiment, the position information of the encoded block in the frame image to be encoded is used as local information relating to the encoded block.

The determination unit 41 determines whether the encoded block is positioned on the image for the left eye than the boundary between the image for the left eye and the image for the right eye or positioned on the image for the right eye, based on the position information of the encoded block input as local information relating to the encoded block.

In the event that determination is made that the encoded block is positioned on the image for the left eye, the determination unit 41 determines that the pixel values of the area A of the reference block (boundary block) which straddles the boundary in FIG. 15 is higher in correlation with the pixel values of the encoded block than the pixel values of the area B (determination result 1).

In the event that determination is made that the encoded block is positioned on the image for the right eye, the determination unit 41 determines that the pixel values of the area B of the boundary block in FIG. 15 is higher in correlation with the pixel values of the encoded block than the pixel values of the area A (determination result 2).

In the event that the determination result of the determination unit 41 is the determination result 1, the substitution unit 44 performs extrapolation in the extrapolation direction from the area A toward the area B. Also, in the event that the determination result of the determination unit 41 is the determination result 2, the substitution unit 44 performs extrapolation in the extrapolation direction from the area B toward the area A. In FIG. 15, the extrapolation direction from the area A toward the area B is exemplified.

The direction and size of movement of an object are frequently continued, and there are a few changes in sudden movement. Accordingly, determination may be made that the pixel values of an area spatially approximated to the position of the encoded block, with a boundary block, is higher in correlation with the pixel values of the encoded block than the pixel values of an area spatially distant therefrom. Accordingly, extrapolation (substitution) is performed by determining the extrapolation direction as described above, and accordingly, deterioration in encoding efficiency is suppressed.

Figure 16:
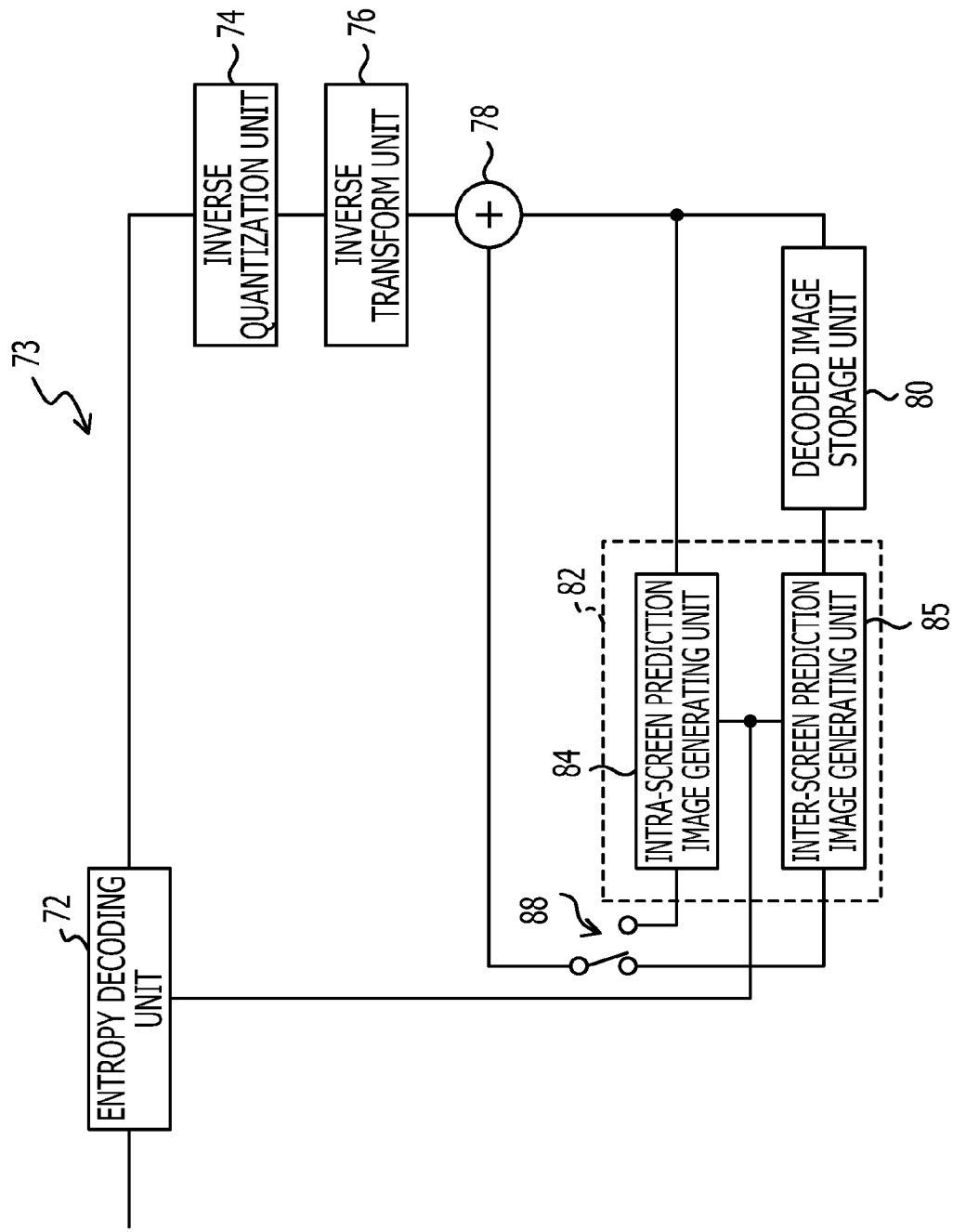
FIG. 16 is a block diagram illustrating the schematic configuration of a decoding device described in the third embodiment.
Figure 17:
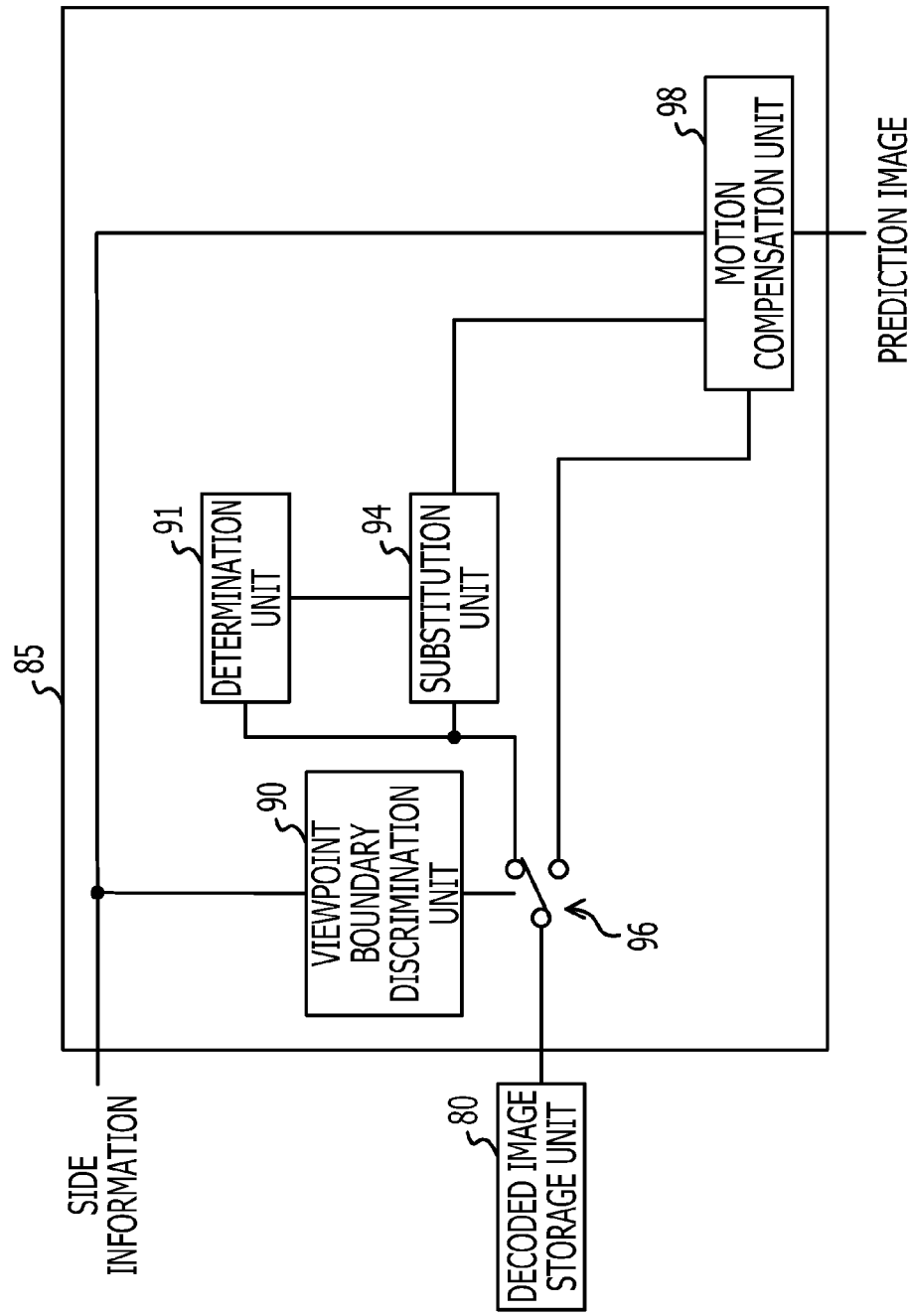
FIG. 17 is a block diagram illustrating the schematic configuration of an inter-screen prediction image generating unit of the decoding device described in the third embodiment.

Next, the decoding device 73 according to the third embodiment will be described. FIG. 16 illustrates the decoding device 73 according to the third embodiment. A component different from the first embodiment is an inter-screen prediction image generating unit 85. With the inter-screen prediction image generating unit 85 according to the third embodiment, as illustrated in FIG. 17, there is provided a determination unit 91 which determines correlation using a determination method different from the determination unit 92 according to the first embodiment. The determination unit 91 according to the third embodiment uses the position information of the decoded block at the time of determining correlation. The configuration other than this is the same as with the first embodiment, and accordingly, the same portions as with the first embodiment are denoted with the same reference numerals, and description of the configuration thereof will be omitted, and only portions different from the first embodiment will be described.

Now, the operations of the determination unit 91 and substitution unit 94 according to the present embodiment will briefly be described with reference to FIG. 15. However, description will be made here by substituting the frame image to be decoded for the frame image to be encoded illustrated in FIG. 15, and substituting the decoded block for the encoded block. Reference symbols A and B in the drawing will be used without change.

The determination unit 91 determines correlation height with the image of the decoded block regarding each of the image of the area A and the image of the area B of the boundary block using the position information of the decoded block within the frame image to be decoded as local information relating to the decoded block.

Specifically, in the event that determination is made that the decoded block is positioned on the image for the left eye, the determination unit 91 determines that the pixel values of the area A of the reference block (boundary block) which straddles the boundary in FIG. 15 is higher in correlation with the pixel values of the encoded block than the pixel values of the area B (determination result 1).

In the event that determination is made that the decoded block is positioned on the image for the right eye, the determination unit 91 determines that the pixel values of the area B of the boundary block in FIG. 15 is higher in correlation with the pixel values of the encoded block than the pixel values of the area A (determination result 2).

In the event that the determination result of the determination unit 91 is the determination result 1, the substitution unit 94 performs extrapolation in the extrapolation direction from the area A toward the area B. Also, in the event that the determination result of the determination unit 91 is the determination result 2, the substitution unit 94 performs extrapolation in the extrapolation direction from the area B toward the area A. In FIG. 15, the extrapolation direction from the area A toward the area B is exemplified.

As described above, discrimination is made whether or not the reference block to be referenced is the boundary block when detecting a motion vector in the encoding devices 10, 11, and 13, and when performing motion compensation in accordance with a motion vector specified in the decoding devices 70, 71, and 73. In the event that the reference block is the boundary block, correlation is determined as described above based on local information relating to the encoded block or decoded block. Based on determination thereof, the extrapolation direction is selected from an area where correlation is higher to an area where correlation is lower, and extrapolation processing (substitution processing) is performed.

In this way, with the boundary block, motion compensation or the like is performed by substituting pixel values having high correlation with the pixel values of the encoded block or decoded block for pixel values having low correlation with the pixel values of the encoded block or decoded block, and accordingly, prediction error may be reduced.

Figure 18:
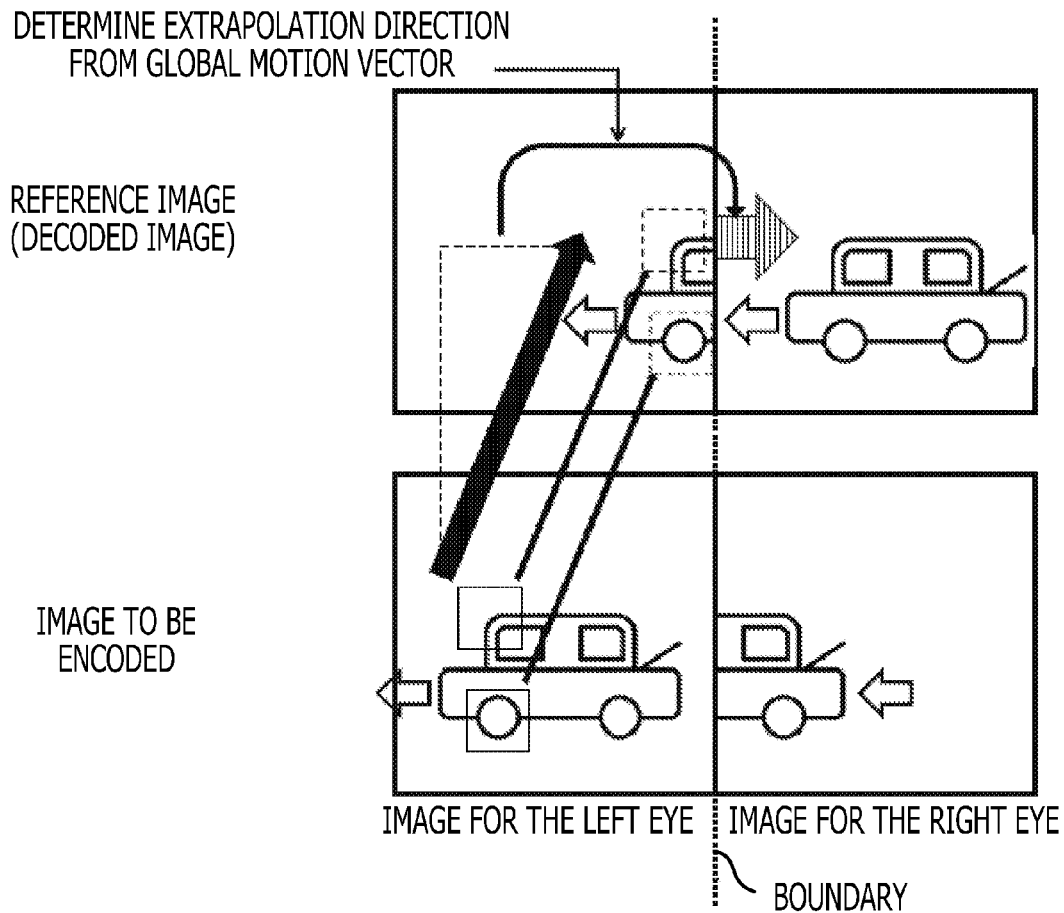
FIG. 18 is an explanatory diagram for briefly describing processing for determining an extrapolation direction using a global motion vector.

Note that, as illustrated in FIG. 18, a method may also be conceived wherein a frame image is divided into multiple areas, a global motion vector which is a motion vector of the entire image is obtained from the statistics value of the motion vector of each area, and the extrapolation direction is determined with the obtained global motion vector, thereby performing extrapolation (substitution).

Figure 19:
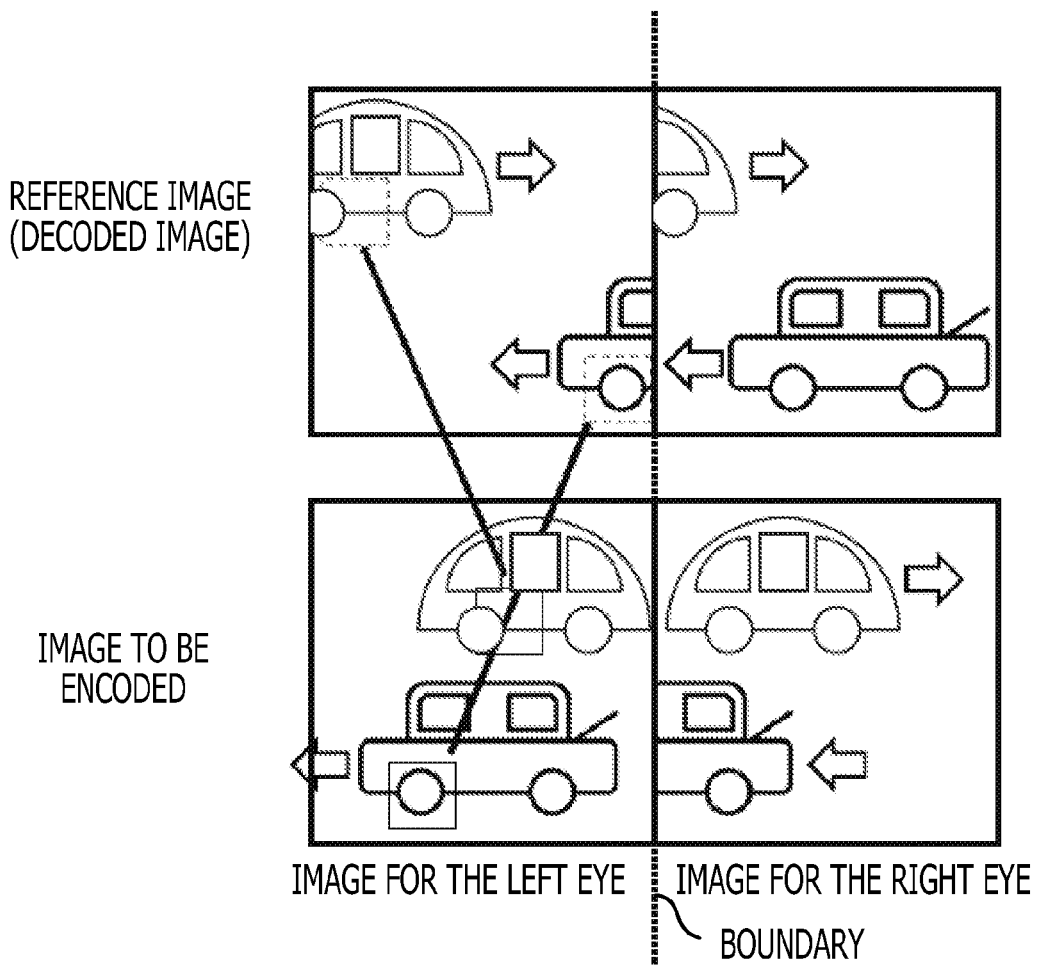
FIG. 19 is an explanatory diagram for describing a state in which a motion vector within a frame image greatly differs for each area.

However, with such a method, as illustrated in FIG. 19, in the event that the motion of an object within a frame image is various, a global motion vector generated by obtaining statistics value according to averaging or the like may greatly differ from the motion vector of each of the areas. Accordingly, even if extrapolation is performed by obtaining the extrapolation direction using such a global motion vector, this extrapolation does not reduce prediction error, but on the contrary, encoding efficiency may be deteriorated.

Figure 20:
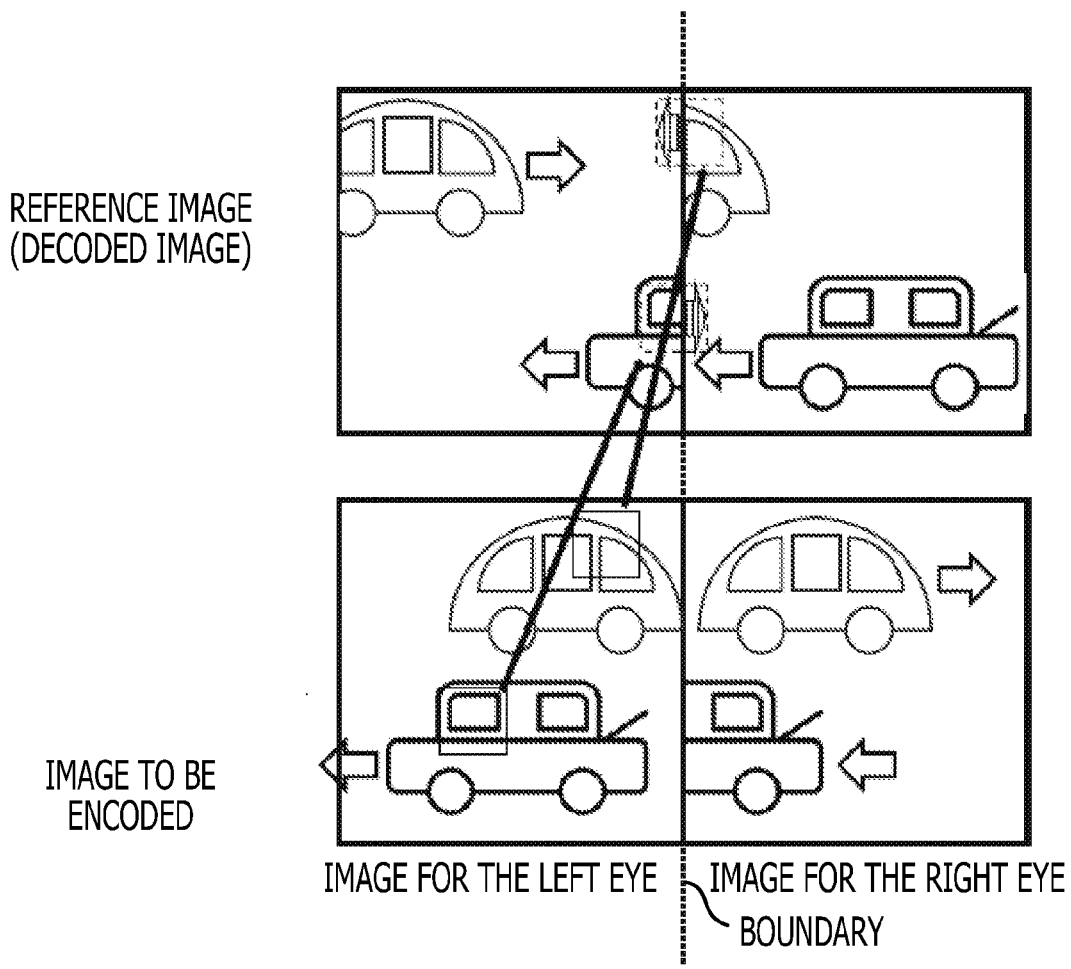
FIG. 20 is an explanatory diagram for briefly describing processing for determining an extrapolation direction using local information regarding an encoded block or decoded block without using a global motion vector.

On the other hand, with the above embodiments, as illustrated in FIG. 20, extrapolation has been performed by determining correlation based on local information relating to the encoded block or decoded block, whereby prediction error may be reduced as compared to the case of determining correlation based on a global motion vector.

Figure 21:
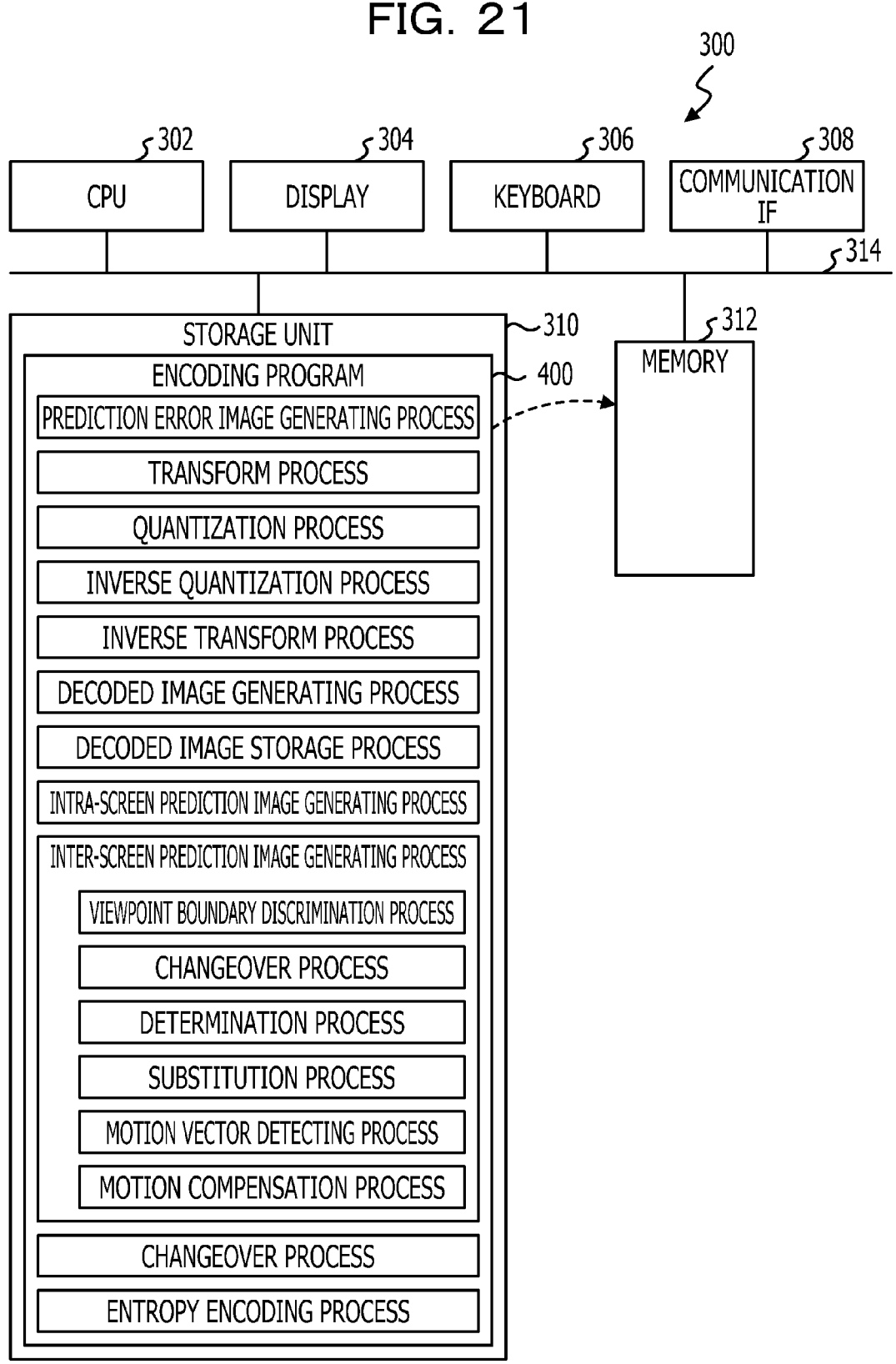
FIG. 21 is a schematic block diagram illustrating an example of a hardware configuration according to a mode wherein an encoding device is realized by a program.

Incidentally, the functions of the encoding device 10 according to the first embodiment may be realized by a computer 300 illustrated in FIG. 21 for example. The computer 300 includes a CPU 302, a display 304, a keyboard 306 serving as an example of an operating unit, a communication IF (interface) 308, a nonvolatile storage unit 310, and memory 312, which are mutually connected vi a bus 314.

An encoding program 400 causing the computer 300 to serve as the encoding device 10 is stored in the storage unit 310. The CPU 302 reads out the encoding program 400 from the storage unit 310, loads to the memory 312, and executes processes included in the encoding program 400. The encoding program 400 includes a prediction error image generating process, a transform process, a quantization process, an inverse quantization process, an inverse transform process, a decoded image generating process, and a decoded image storage process. Moreover, the encoding program 400 further includes an intra-screen prediction image generating process, an inter-screen prediction image generating process, a changeover process, and an entropy encoding process.

The CPU 302 executes the prediction error image generating process, thereby operating as the prediction error image generating unit 12 illustrated in FIG. 1. The CPU 302 executes the transform process, thereby operating as the transform unit 14 illustrated in FIG. 1. The CPU 302 executes the quantization process, thereby operating as the quantization unit 16 illustrated in FIG. 1. The CPU 302 executes the inverse quantization process, thereby operating as the inverse quantization unit 18 illustrated in FIG. 1. The CPU 302 executes the inverse transform process, thereby operating as the inverse transform unit 20 illustrated in FIG. 1. The CPU 302 executes the decoded image generating process, thereby operating as the decoded image generating unit 22 illustrated in FIG. 1. The CPU 302 executes the decoded image storage process, thereby operating as the decoded image storage unit 24 illustrated in FIG. 1. The CPU 302 executes the intra-screen prediction image generating process, thereby operating as the intra-screen prediction image generating unit 28 illustrated in FIG. 1. The CPU 302 executes the inter-screen prediction image generating process, thereby operating as the inter-screen prediction image generating unit 30 illustrated in FIG. 1. The CPU 302 executes the changeover process, thereby operating as the changeover switch 32 illustrated in FIG. 1. The CPU 302 executes the entropy encoding process, thereby operating as the entropy encoding unit 34 illustrated in FIG. 1.

Note that this inter-screen prediction image generating process includes sub processes such as a viewpoint boundary discrimination process, a determination process, a substitution process, a changeover process, a motion vector detecting process, a motion compensation process, and so forth.

The CPU 302 executes the viewpoint boundary discrimination process, thereby operating as the viewpoint boundary discrimination unit 40 illustrated in FIG. 2. The CPU 302 executes the determination process, thereby operating as the determination unit 42 illustrated in FIG. 2. The CPU 302 executes the substitution process, thereby operating as the substitution unit 44 illustrated in FIG. 2. The CPU 302 executes the changeover process, thereby operating as the changeover switch 46 illustrated in FIG. 2. The CPU 302 executes the motion vector detecting process, thereby operating as the motion vector detecting unit 48 illustrated in FIG. 1. The CPU 302 executes the motion compensation process, thereby operating as the motion compensation unit 58 illustrated in FIG. 2.

Thus, the computer 300 which executes the encoding program 400 serves as the encoding device 10.

Note that the encoding device 11 according to the second embodiment may also be realized even by the computer 300 illustrated in FIG. 21 in the same way. This case is realized by adding a side information storage process to the encoding program 400, and substituting the determination process for executing the determination method described in the second embodiment for the determination process which is a sub process of the inter-screen prediction image generating process of the encoding program 400.

Also, the encoding device 13 according to the third embodiment may also be realized even by the computer 300 illustrated in FIG. 21 in the same way. This case is realized by substituting the determination process for executing the determination method described in the third embodiment for the determination process which is a sub process of the inter-screen prediction image generating process of the encoding program 400.

Figure 22:
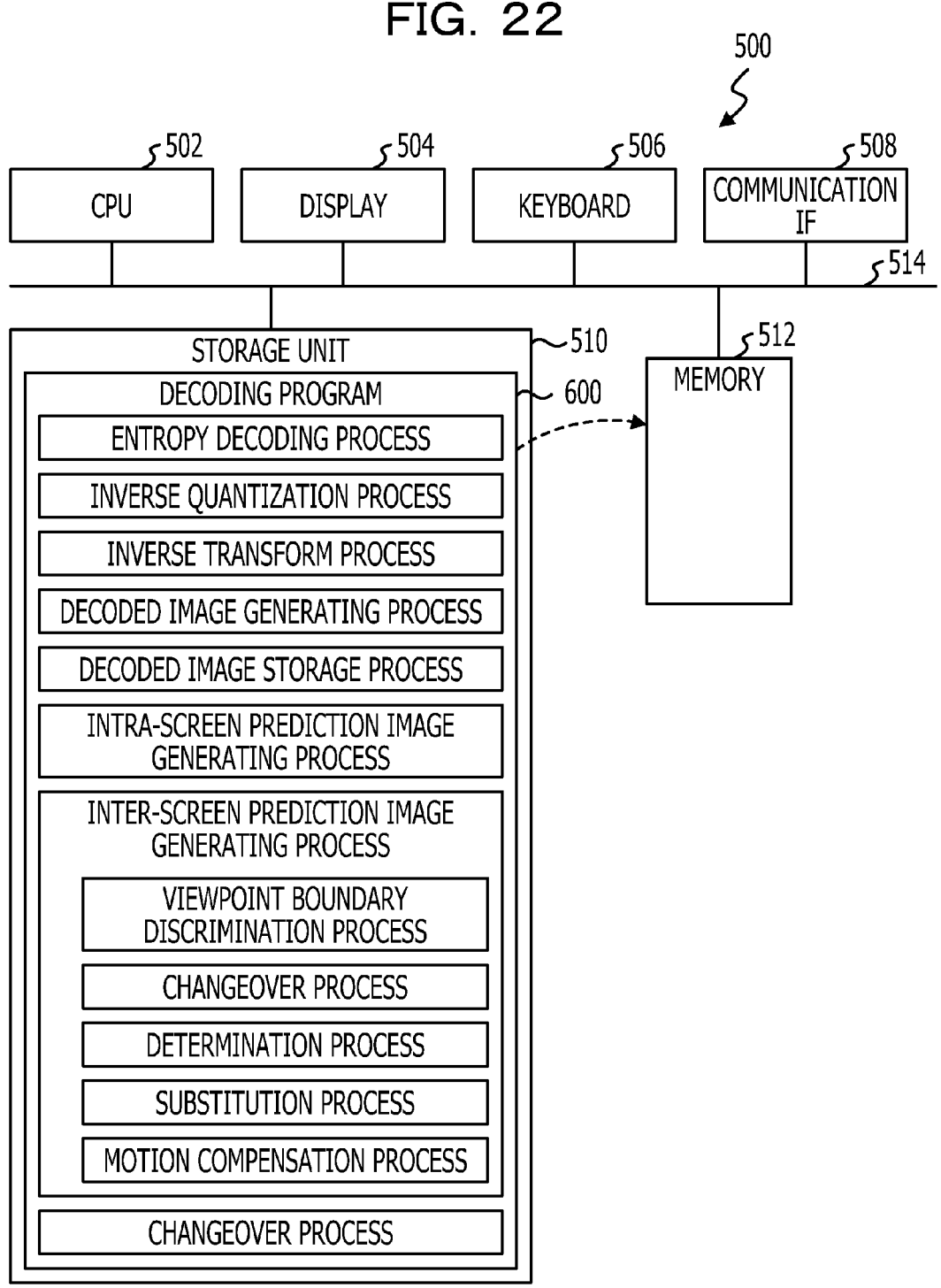
FIG. 22 is a schematic block diagram illustrating an example of a hardware configuration according to a mode wherein a decoding device is realized by a program.

Also, the functions of the decoding device 70 according to the first embodiment may be realized by a computer 500 illustrated in FIG. 22 for example. The computer 500 includes a CPU 502, a display 504, a keyboard 506 serving as an example of an operating unit, a communication IF (interface) 508, a nonvolatile storage unit 510, and memory 512, which are mutually connected vi a bus 514.

A decoding program 600 causing the computer 500 to serve as the decoding device 70 is stored in the storage unit 510. The CPU 502 reads out the decoding program 600 from the storage unit 510, loads to the memory 512, and executes processes included in the decoding program 600. The decoding program 600 includes an entropy decoding process, an inverse quantization process, an inverse transform process, a decoded image generating process, a decoded image storage process, an intra-screen prediction image generating process, an inter-screen prediction image generating process, and a changeover process.

The CPU 502 executes the entropy decoding process, thereby operating as the entropy decoding unit 72 illustrated in FIG. 5. The CPU 502 executes the inverse quantization process, thereby operating as the inverse quantization unit 74 illustrated in FIG. 5. The CPU 502 executes the inverse transform process, thereby operating as the inverse transform unit 76 illustrated in FIG. 5. The CPU 502 executes the decoded image generating process, thereby operating as the decoded image generating unit 78 illustrated in FIG. 5. The CPU 502 executes the decoded image storage process, thereby operating as the decoded image storage unit 80 illustrated in FIG. 5. The CPU 502 executes the intra-screen prediction image generating process, thereby operating as the intra-screen prediction image generating unit 84 illustrated in FIG. 5. The CPU 502 executes the inter-screen prediction image generating process, thereby operating as the inter-screen prediction image generating unit 86 illustrated in FIG. 5. The CPU 502 executes the changeover process, thereby operating as the changeover switch 88 illustrated in FIG. 5.

Note that this inter-screen prediction image generating process includes sub processes such as a viewpoint boundary discrimination process, a determination process, a substitution process, a motion compensation process, and so forth.

The CPU 502 executes the viewpoint boundary discrimination process, thereby operating as the viewpoint boundary discrimination unit 90 illustrated in FIG. 6. The CPU 502 executes the determination process, thereby operating as the determination unit 92 illustrated in FIG. 6. The CPU 502 executes the substitution process, thereby operating as the substitution unit 94 illustrated in FIG. 6. The CPU 502 executes the motion compensation process, thereby operating as the motion compensation unit 98 illustrated in FIG. 6.

Thus, the computer 500 which executes the decoding program 600 serves as the decoding device 70.

Note that the decoding device 71 according to the second embodiment may also be realized even by the computer 500 illustrated in FIG. 22 in the same way. This case is realized by adding a side information storage process to the decoding program 600, and substituting the determination process for executing the determination method described in the second embodiment for the determination process which is a sub process of the inter-screen prediction image generating process of the decoding program 600.

Also, the decoding device 73 according to the third embodiment may also be realized even by the computer 500 illustrated in FIG. 22 in the same way. This case is realized by substituting the determination process for executing the determination method described in the third embodiment for the determination process which is a sub process of the inter-screen prediction image generating process of the decoding program 600.

Further, though the above description has been made regarding a mode wherein the encoding program 400 is stored in the storage unit 310, the encoding program 400 may also be provided by a mode recorded in a portable recording medium such as CD-ROM, DVD-ROM, USB memory, or the like. Similarly, though the above description has been made regarding a mode wherein the decoding program 600 is stored in the storage unit 510, the decoding program 600 may also be provided by a mode recorded in a portable recording medium such as CD-ROM, DVD-ROM, USB memory, or the like.

Also, with the above embodiments, a case has been exemplified where the frame images of a moving image are frame images generated by the side-by-side method, but the generating method is not restricted to this, and for example, even frame images generated by the top-and-down method may be processed in the same way. In the event of processing a boundary block which straddles the boundary of two images vertically disposed, in the same way as described above, prediction error may be reduced in the same way.

Note that, with the inter-screen prediction encoding method described in the above embodiments, there are a P frame to be predicted from one frame image encoded in the past, and a B frame to be predicted from two frame images encoded in the past. Even with either frame, with regard to a boundary block of a frame image to be referenced at the time of encoding or decoding a block to be encoded or decoded, as described above, a prediction image may be generated by performing determination of correlation and substitution processing. Thus, prediction error is reduced.

Also, with the above embodiments, description has been made with reference to a frame image where two images having a mutually different viewpoint are disposed, as an example, but a frame image to be applied is not restricted to this. For example, the above embodiments may also be applied to a frame image where two arbitrary images are disposed.

All of the literatures, patent applications, and technology standards described in the present Specification are encompassed in the present Specification by reference in the same level as with a case where each of the literatures, patent applications, and technology standards is specifically individually described so as to be encompassed in the present Specification by reference.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An encoding device comprising:
a memory; and
a processor coupled to the memory, the processor configured to:
specify a boundary block from among a plurality of image blocks, the plurality of image blocks being generated by dividing a coupled frame image, the coupled frame image being one of a plurality of coupled images included in a video data, each of the plurality of coupled images being generated by coupling a first image and a second image together so that a right side of the first image comes in contact with a left side of the second image, the boundary block including both a part of the right side of the first image and a part of the left side of the second image, the first image being an image for a left eye, the second image being an image for a right eye;
determine first correlation degree and second correlation degree, the first correlation degree being correlation degree between a part of the first image included in the boundary block and an image block included in another coupled frame image, the second correlation degree being correlation degree between a part of the second image included in the boundary block and the image block included in the another coupled frame image, the image block included in the another coupled frame image being generated by dividing the another coupled frame image included in the plurality of coupled images;
generate a substitution block by substituting the part of the first image with a substitution image generated based on the part of the second image when the first correlation degree is lower than the second correlation degree, or by substituting the part of the second image with a substitution image generated based on the part of the first image when the second correlation degree is lower than the first correlation degree; and
perform an inter-image prediction encoding for the image block included in the another coupled frame image by using the substitution block.

2. An decoding device comprising:
a memory; and
a processor coupled to the memory, the processor configured to:
specify a boundary block from among a plurality of image blocks, the plurality of image blocks being generated by dividing a coupled frame image, the coupled frame image being one of a plurality of coupled images included in a video data, each of the plurality of coupled images being generated by coupling a first image and a second image together so that a right side of the first image comes in contact with a left side of the second image, the boundary block including both a part of the right side of the first image and a part of the left side of the second image, the first image being an image for a left eye, the second image being an image for a right eye;
determine first correlation degree and second correlation degree, the first correlation degree being correlation degree between a part of the first image included in the boundary block and an image block included in another coupled frame image, the second correlation degree being correlation degree between a part of the second image included in the boundary block and the image block included in the another coupled frame image, the image block included in the another coupled frame image being generated by dividing the another coupled frame image included in the plurality of coupled images;
generate a substitution block by substituting the part of the first image with a substitution image generated based on the part of the second image when the first correlation degree is lower than the second correlation degree, or by substituting the part of the second image with a substitution image generated based on the part of the first image when the second correlation degree is lower than the first correlation degree; and
perform an inter-image prediction decoding for the image block included in the another coupled frame image by using the substitution block.

3. An encoding method comprising:
specifying a boundary block from among a plurality of image blocks, the plurality of image blocks being generated by dividing a coupled frame image, the coupled frame image being one of a plurality of coupled images included in a video data, each of the plurality of coupled images being generated by coupling a first image and a second image together so that a right side of the first image comes in contact with a left side of the second image, the boundary block including both a part of the right side of the first image and a part of the left side of the second image, the first image being an image for a left eye, the second image being an image for a right eye;
determining first correlation degree and second correlation degree, the first correlation degree being correlation degree between a part of the first image included in the boundary block and an image block included in another coupled frame image, the second correlation degree being correlation degree between a part of the second image included in the boundary block and the image block included in the another coupled frame image, the image block included in the another coupled frame image being generated by dividing the another coupled frame image included in the plurality of coupled images;
generating a substitution block by substituting the part of the first image with a substitution image generated based on the part of the second image when the first correlation degree is lower than the second correlation degree, or by substituting the part of the second image with a substitution image generated based on the part of the first image when the second correlation degree is lower than the first correlation degree; and
performing an inter-image prediction encoding for the image block included in the another coupled frame image by using the substitution block.

4. An decoding method comprising:
specifying a boundary block from among a plurality of image blocks, the plurality of image blocks being generated by dividing a coupled frame image, the coupled frame image being one of a plurality of coupled images included in a video data, each of the plurality of coupled images being generated by coupling a first image and a second image together so that a right side of the first image comes in contact with a left side of the second image, the boundary block including both a part of the right side of the first image and a part of the left side of the second image, the first image being an image for a left eye, the second image being an image for a right eye;

determining first correlation degree and second correlation degree, the first correlation degree being correlation degree between a part of the first image included in the boundary block and an image block included in another coupled frame image, the second correlation degree being correlation degree between a part of the second image included in the boundary block and the image block included in the another coupled frame image, the image block included in the another coupled frame image being generated by dividing the another coupled frame image included in the plurality of coupled images;

generating a substitution block by substituting the part of the first image with a substitution image generated based on the part of the second image when the first correlation degree is lower than the second correlation degree, or by substituting the part of the second image with a substitution image generated based on the part of the first image when the second correlation degree is lower than the first correlation degree; and performing an inter-image prediction decoding for the image block included in the another coupled frame image by using the substitution block.

* * * * *